(12) United States Patent
Hamamura et al.

(10) Patent No.: US 10,434,606 B2
(45) Date of Patent: Oct. 8, 2019

(54) GRAIN-ORIENTED ELECTRICAL STEEL SHEET

(71) Applicant: NIPPON STEEL & SUMITOMO METAL CORPORATION, Tokyo (JP)

(72) Inventors: Hideyuki Hamamura, Futtsu (JP); Tatsuhiko Sakai, Oita (JP); Fumiaki Takahashi, Kisarazu (JP); Hisashi Mogi, Yachiyo (JP); Shunsuke Okumura, Kitakyusyu (JP); Hirofumi Imai, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 119 days.

(21) Appl. No.: 15/549,784

(22) PCT Filed: Apr. 19, 2016

(86) PCT No.: PCT/JP2016/062339
§ 371 (c)(1),
(2) Date: Aug. 9, 2017

(87) PCT Pub. No.: WO2016/171117
PCT Pub. Date: Oct. 27, 2016

(65) Prior Publication Data
US 2018/0043474 A1    Feb. 15, 2018

(30) Foreign Application Priority Data
Apr. 20, 2015   (JP) .................................. 2015-086301

(51) Int. Cl.
*B23K 26/364* (2014.01)
*B23K 26/359* (2014.01)
(Continued)

(52) U.S. Cl.
CPC .......... *B23K 26/364* (2015.10); *B05D 3/0254* (2013.01); *B05D 7/14* (2013.01);
(Continued)

(58) Field of Classification Search
CPC ..... C21D 7/00; C21D 2201/05; C21D 8/1294
See application file for complete search history.

(56) References Cited

U.S. PATENT DOCUMENTS 3,932,234 A † 1/1976 Imanaka et al.
5,393,355 A   2/1995 Nakano et al.
(Continued)

FOREIGN PATENT DOCUMENTS

CN     102639726 A    8/2012
CN     104099458 A   10/2014
(Continued)

OTHER PUBLICATIONS

Korean Notice of Allowance, dated Dec. 29, 2018, for counterpart Korean Application No. 10-2017-7020838, with an English translation.
(Continued)

*Primary Examiner* — Betelhem Shewareged
(74) *Attorney, Agent, or Firm* — Birch, Stewart, Kolasch & Birch, LLP

(57) ABSTRACT

Provided is a grain-oriented electrical steel sheet including a steel sheet having a steel sheet surface in which a groove, which extends in a direction intersecting a rolling direction and of which a groove depth direction matches a sheet thickness direction, is formed. When an average value of a groove depth in a sheet thickness direction at a central portion of the groove in a longitudinal groove direction is set as an average groove depth D, a straight line, which connects a first point at which a groove depth in the sheet thickness direction becomes 0.05×D and a second point at which the
(Continued)

groove depth becomes 0.50×D, at an inclined portion of the groove is set as a groove end straight line, an angle made by the steel sheet surface and the groove end straight line is set as a first angle θ, and an average value of a groove-width-direction length, which is a length of a line segment connecting two points at which a groove depth in the sheet thickness direction in a contour of the groove on the groove-width-direction cross-section becomes 0.05×D, is set as an average groove width W, an aspect ratio A obtained by dividing the average groove depth D by the average groove width W, and the first angle θ satisfy the following Expression (1).

$$\theta < -21 \times A + 77 \qquad (1)$$

6 Claims, 11 Drawing Sheets

(51) Int. Cl.
```
C21D 8/12      (2006.01)
C21D 7/00      (2006.01)
C25F 1/00      (2006.01)
C22C 38/00     (2006.01)
H01F 1/16      (2006.01)
B05D 3/02      (2006.01)
B05D 7/14      (2006.01)
C21D 3/04      (2006.01)
C21D 6/00      (2006.01)
C21D 8/00      (2006.01)
C21D 9/46      (2006.01)
C22C 38/02     (2006.01)
C22C 38/04     (2006.01)
C22C 38/06     (2006.01)
C22C 38/42     (2006.01)
```
(52) U.S. Cl.
CPC .............. *B23K 26/359* (2015.10); *C21D 3/04* (2013.01); *C21D 6/004* (2013.01); *C21D 6/005* (2013.01); *C21D 6/008* (2013.01); *C21D 7/00* (2013.01); *C21D 8/005* (2013.01); *C21D 8/12* (2013.01); *C21D 8/1255* (2013.01); *C21D 8/1261* (2013.01); *C21D 8/1294* (2013.01); *C21D 9/46* (2013.01); *C22C 38/00* (2013.01); *C22C 38/001* (2013.01); *C22C 38/002* (2013.01); *C22C 38/008* (2013.01); *C22C 38/02* (2013.01); *C22C 38/04* (2013.01); *C22C 38/06* (2013.01); *C22C 38/42* (2013.01); *C25F 1/00* (2013.01); *H01F 1/16* (2013.01); *C21D 2201/05* (2013.01); *C22C 2202/02* (2013.01)

(56) References Cited

U.S. PATENT DOCUMENTS

| | | | |
|---|---|---|---|
| 6,110,298 A * | 8/2000 | Senda | C21D 8/12 148/111 |
| 2009/0145526 A1 | 6/2009 | Arai et al. | |
| 2013/0017408 A1 | 1/2013 | Sakai et al. | |
| 2013/0129984 A1 | 5/2013 | Omura et al. | |
| 2013/0206283 A1 | 8/2013 | Inoue et al. | |
| 2015/0059932 A1 | 3/2015 | Hirano et al. | |
| 2015/0111004 A1* | 4/2015 | Senda | B21B 3/02 428/164 |
| 2016/0284454 A1 | 9/2016 | Hirano et al. | |

FOREIGN PATENT DOCUMENTS

| | | |
|---|---|---|
| CN | 104203486 A | 12/2014 |
| CN | 104284994 A | 1/2015 |
| JP | 51-13469 B | 4/1976 |
| JP | 58-026406 B2 | 6/1983 |
| JP | 62-053579 B2 | 11/1987 |
| JP | 62-054873 B2 | 11/1987 |
| JP | 5-121224 A | 5/1993 |
| JP | 6-116642 A | 4/1994 |
| JP | 7-138648 A | 5/1995 |
| JP | 7-268474 A | 10/1995 |
| JP | 8-90756 A | 4/1996 |
| JP | H08-90756 A † | 4/1996 |
| JP | 8-269563 A | 10/1996 |
| JP | H08-269563 A † | 10/1996 |
| JP | 2003-129135 A | 5/2003 |
| JP | 3419024 B2 | 6/2003 |
| JP | 2012-102395 A | 5/2012 |
| JP | 2014-73518 A | 4/2014 |
| JP | 2014-073518 A † | 4/2014 |
| JP | 2015-510543 A | 4/2015 |
| KR | 10-2008-0010454 A | 1/2008 |
| RU | 2509163 C1 | 3/2014 |
| RU | 2537059 C2 | 12/2014 |
| WO | WO 2012/165393 A1 | 12/2012 |
| WO | WO 2014/080763 A1 | 5/2014 |

OTHER PUBLICATIONS

Chinese Office Action dated May 30, 2018, issued in counterpart Chinese Patent Application No. 201680008023.4, with English language translation.
Deguchi, "Electrolytic Etching Machining Ethylene Glycol Solutions," Journal of the Surface Finishing Society of Japan, vol. 61, No. 4, 2010, pp. 305-308 (6 pages total), with a partial English translation.
Japanese Notification issued in Japanese Application No. 2017-514123 dated Nov. 7, 2017, together with an English translation.
Kubota, "Original Point of Craftsmanship—World of Science vol. 17 Electrical Steel Sheet, Properties of 'iron' as a magnetic material are extracted to maximum extent (Second volume)," Nippon Steel Monthly, vol. 148, May 2005, pp. 9-12 (8 pages total), together with a partial English translation.
Sato et al., "Lecture: Recent fine processing technologies (No. 1) Shape formation by etching-bulk micromachining," Micromachine, Micromachine Center, No. 31, Apr. 2000, pp. 18-19 (6 pages total), together with a partial English translation.
Sato et al., "Heat-Proof Domain-Refined Grain-Oriented Electrical Steel," Kawasaki Steel Technical Report, No. 39, Oct. 1998, pp. 21-28, originally published in Kawasaki Steel Giho, vol. 29, No. 3, 1997, pp. 153-158 (14 pages total), together with an English translation.
Japanese Third Party Submission dated Oct. 16, 2018, for corresponding Japanese Application No. 2017-514123, with an English translation.
Russian Office Action and Search Report, dated Oct. 19, 2018, for Russian Application No. 2017131421, along with an English translation.
International Search Report (PCT/ISA/210) issued in PCT/JP2016/062339, dated Aug. 2, 2016.
Written Opinion (PCT/ISA/237) issued in PCT/JP2016/062339, dated Aug. 2, 2016.
Extended European Search Report for counterpart Application No. 16783138.7, dated Sep. 5, 2018.
Japanese Office Action for Japanese Application No. 2017-514132, dated Jun. 26, 2018, with English translation.
Japanese Office Action for Japanese Application No. 2017-514133, dated Jun. 26, 2018, with English translation.
Japanese Opposition for counterpart Japanese Application No. 2017-514123 (Japanese Patent No. 6418322), dated May 30, 2019, with partial English translation.
Title: Origin of Manufacturing—The World of Science, vol. 17, Electrical Steel: Exploiting Properties of 'Iron' as a Magnetic

(56) References Cited

OTHER PUBLICATIONS

Material to Maximum (final part); Authors: Takeshi Kubota; Journal: Nippon Steel Monthly (vol. 148); Publication Date: May 2005; pp. 9-12.†
Title: Electrolytic Etching Machining by Ethylene Glycol Solutions; Authors: Takahisa Deguchi; Journal: The Surface Finishing Society of Japan (vol. 61, Issue No. 4); Publication Date: 2010; pp. 305-308.†
Title: Course of Study on Recent Technology of Micromachining [part 1]—Forming by Etching—Bulk Micromachining; Authors: Kazuo Sato; Journal: Micromachine (vol. 31); Publication Date: Apr. 2000; pp. 18-19.†
Title: Heat-Proof Domain-Refined Grain-Oriented Electrical Steel; Authors: Keiji Sato et al.; Journal: Kawasaki Steel Giho (vol. 29, Issue No. 3); Publication Date: 1997; pp. 153-158.†

\* cited by examiner
† cited by third party

GRAIN-ORIENTED ELECTRICAL STEEL SHEET

TECHNICAL FIELD OF THE INVENTION

The present invention relates to a grain-oriented electrical steel sheet.

Priority is claimed on Japanese Patent Application No. 2015-086301, filed on Apr. 20, 2015, the content of which is incorporated herein by reference.

RELATED ART

In the related art, as a steel sheet for an iron core of a transformer, there is known a grain-oriented electrical steel sheet that exhibits excellent magnetic characteristics in a specific direction. The grain-oriented electrical steel sheet is a steel sheet in which a crystal orientation is controlled so that a magnetization easy axis of a crystal grain and a rolling direction match each other by a combination of a cold rolling treatment and an annealing treatment. It is preferable that an iron loss of the grain-oriented electrical steel sheet is as small as possible.

The iron loss is classified into an eddy current loss and a hysteresis loss. In addition, the eddy current loss is classified into a classical eddy current loss and an anomalous eddy current loss. Typically, there is known a grain-oriented electrical steel sheet in which an insulating film is formed on a surface of a steel sheet (base metal) of which a crystal orientation is controlled as described above so as to reduce the classical eddy current loss. The insulating film also plays a role of applying electrical insulating properties, tensile strength, heat resistance, and the like to the steel sheet. Furthermore, recently, there is also known a grain-oriented electrical steel sheet in which a glass film is formed between the steel sheet and the insulating film.

On the other hand, as a method of reducing the anomalous eddy current loss, there is known a magnetic domain control method of narrowing a width of a 180° magnetic domain (performing refinement of the 180° magnetic domain) by forming a strain or a groove, which extends in a direction intersecting the rolling direction, at a predetermined interval along the rolling direction. The magnetic domain control method is classified into a non-destructive magnetic domain control method in which the strain is applied to the steel sheet of the grain-oriented electrical steel sheet by non-destructive means, and a destructive magnetic domain control method in which a groove is formed in a surface of the steel sheet as an example.

In a case of manufacturing a wound core for a transformer by using the grain-oriented electrical steel sheet, it is necessary to perform a stress relief annealing treatment so as to remove a deformation strain that occurs when the grain-oriented electrical steel sheet is coiled in a coil shape. In a case of manufacturing the wound core by using a grain-oriented electrical steel sheet to which a strain is applied by using the non-destructive magnetic domain control method, the strain is disappeared due to execution of the stress relief annealing treatment. Therefore, a magnetic domain refinement effect (that is, an anomalous eddy current loss reducing effect) is also lost.

On the other hand, in a case of manufacturing the wound core by using a grain-oriented electrical steel sheet to which a groove is applied in accordance with the destructive magnetic domain control method, the groove is not lost due to execution of the stress relief annealing treatment, and it is possible to maintain the magnetic domain refinement effect. Accordingly, as a method of reducing the anomalous eddy current loss, the destructive magnetic domain control method is typically employed with respect to the wound core.

For example, as disclosed in Patent Document 1, a method of applying a strain to a steel sheet through laser irradiation is put into practical use. On the other hand, when forming a groove having a depth of approximately 10 to 30 μm in a direction, which is approximately perpendicular to a rolling direction of the grain-oriented electrical steel sheet, in a constant period in the rolling direction, the iron loss is reduced. The reason for this is as follows. A magnetic pole occurs at the periphery of the groove due to a variation of permeability in a void of the groove, and an interval of a 180° magnetic wall is narrowed due to the magnetic pole. As a result, the iron loss is improved.

Examples of a method of forming the groove in the electrical steel sheet include an electrolytic etching method in which a groove is formed in a steel sheet surface of the grain-oriented electrical steel sheet through the electrolytic etching method (refer to Patent Document 2), a gear press method in which a groove is formed in a steel sheet surface by mechanically pressing a gear on the steel sheet surface of the grain-oriented electrical steel sheet (refer to the following Patent Document 3), and a laser irradiation method in which the steel sheet (portion irradiated with a laser) is melted and evaporated through laser irradiation (refer to Patent Document 4).

PRIOR ART DOCUMENT

Patent Document

[Patent Document 1] Japanese Examined Patent Application, Second Publication No. 558-26406
[Patent Document 2] Japanese Examined Patent Application, Second Publication No. S62-54873
[Patent Document 3] Japanese Examined Patent Application, Second Publication No. S62-53579
[Patent Document 4] Japanese Unexamined Patent Application, First Publication No. 2003-129135

DISCLOSURE OF THE INVENTION

Problems to be Solved by the Invention

In a case of forming the groove having the depth of approximately 10 to 30 μm in a direction that is approximately perpendicular to the rolling direction by using the related art, it is difficult to uniformly maintain a shape of an end of a groove (groove end) on a surface (surface in which the groove is formed) of the electrical steel sheet. Therefore, a variation in the shape of the groove end tends to increase. As a result, when performing coating so as to apply electrical insulating properties to the steel sheet surface after forming the groove, it is difficult to apply a coating agent to every corner of the groove end. In addition, the variation in the shape of the groove end is great. Therefore, adhesiveness of the coating agent may not be sufficient at some sites of the groove end. As a result, since the groove end is not sufficiently coated, the groove is exposed to the outside, and the exposure becomes a cause for occurrence of rust. In addition, in a case of performing grooving by using a laser method, there is a problem that a surface protrusion is likely to occur on the groove end that is formed. For example, when rust occurs, a film at the periphery of the rust is peeled off. Accordingly, when an interlayer current significantly flows, the iron loss may increase. In addition, in a case where the steel sheet is corroded due to the rust, a non-magnetic portion is diffused. Therefore, optimal magnetic domain refinement conditions may not be maintained.

The invention has been made in consideration of the above-described problems, and an object thereof is to provide a grain-oriented electrical steel sheet which includes a groove for a great improvement of an iron loss, and in which adhesiveness of an insulating film and the like and rust resistance are improved in a groove end.

Means for Solving the Problem

The gist of the invention is as follows.

(1) According to an aspect of the invention, there is provided a grain-oriented electrical steel sheet including a steel sheet having a steel sheet surface in which a groove, which extends in a direction intersecting a rolling direction and of which a groove depth direction matches a sheet thickness direction, is formed. The groove includes an inclined portion that is inclined from the steel sheet surface to a bottom of the groove at a groove end in a longitudinal groove direction that is a direction in which the groove extends. When an average value of a depth of the groove in the sheet thickness direction from a height of the steel sheet surface at a central portion in the longitudinal groove direction is set as an average groove depth D in a unit of μm, a straight line, which connects a first point at which the depth of the groove in the sheet thickness direction from the height of the steel sheet surface becomes 0.05×D, and a second point at which the depth of the groove in the sheet thickness direction from the height of the steel sheet surface becomes 0.50×D, at the inclined portion is set as a groove end straight line, an angle made by the steel sheet surface and the groove end straight line is set as a first angle θ in a unit of °, and in a case where the groove is seen on a groove-width-direction cross-section perpendicular to the longitudinal groove direction at the central portion of the groove, an average value of a groove-width-direction length, which is a length of a line segment connecting two points at which a depth of the groove in the sheet thickness direction from the height of the steel sheet surface in a contour of the groove on the groove-width-direction cross-section becomes 0.05×D, is set as an average groove width W of the groove in a unit of tam, an aspect ratio A obtained by dividing the average groove depth D by the average groove width W, and the first angle θ satisfy the following Expression (1).

$$\theta < -21 \times A + 77 \quad (1)$$

(2) In the grain-oriented electrical steel sheet according to (1), the aspect ratio A and the first angle θ may satisfy the following Expression (2).

$$\theta < 32 \times A^2 - 55 \times A + 73 \quad (2)$$

(3) In the grain-oriented electrical steel sheet according to (1) or (2), when the average groove depth D is 15 μm to 30 μm, the first angle θ, the average groove depth D, and the average groove width W may satisfy the following Expression (3).

$$\theta \leq 0.12 \times W - 0.45 \times D + 57.39 \quad (3)$$

(4) In the grain-oriented electrical steel sheet according to (1) or (2), when the average groove width W is 30 μm to 100 μm, the first angle θ, the average groove depth D, and the average groove width W satisfy the following Expression (4).

$$\theta \leq -0.37 \times D + 0.12 \times W + 55.39 \quad (4)$$

(5) In the grain-oriented electrical steel sheet according to any one of (1) to (4), in the steel sheet, a grain size of a crystal grain that is in contact with the groove may be 5 μm or greater.

(6) In the grain-oriented electrical steel sheet according to any one of (1) to (5), the average groove depth D may be 10 μm to 50 μm.

Effects of the Invention

According to the aspect of the invention, it is possible to improve rust resistance of a grain-oriented electrical steel sheet in which a groove is formed in a steel sheet surface for magnetic domain refinement.

EMBODIMENTS OF THE INVENTION

Hereinafter, a preferred embodiment of the invention will be described in detail. However, the invention is not limited to configurations disclosed in this embodiment, and various modifications can be made in a range not departing from the gist of the invention. In addition, the lower limit and the upper limit are also included in numerical value limiting ranges to be described later. However, the lower limit is not included in a numerical value limiting range that is described as "greater than" the lower limit, and the upper limit is not included in a numerical value limiting range that is described as "less than" the upper limit.

Hereinafter, a preferred embodiment of the invention will be described in detail with reference to the accompanying drawings.

Figure 1:
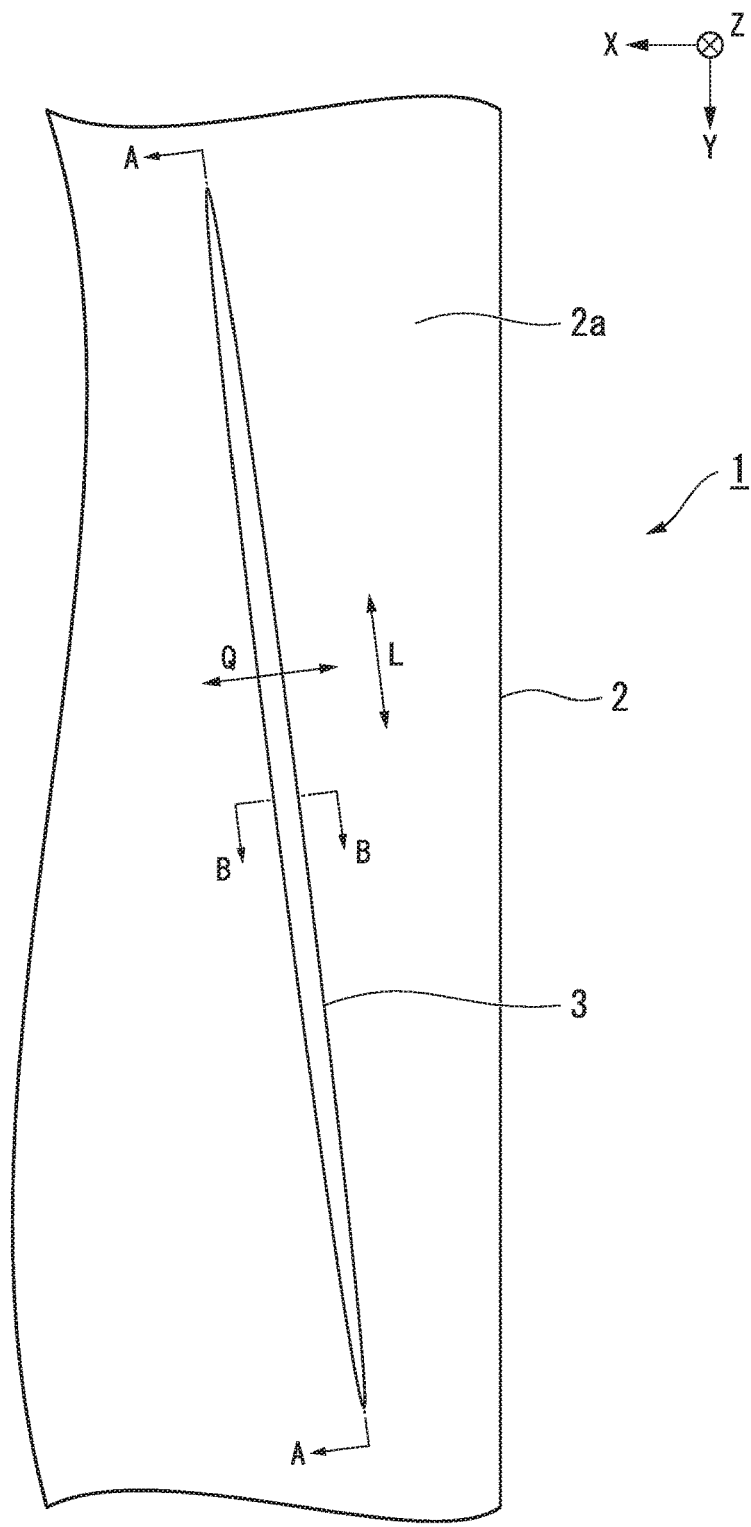
FIG. 1 is a schematic view illustrating a groove that is formed in a steel sheet surface of a grain-oriented electrical steel sheet according to an embodiment of the invention.
Figure 2:
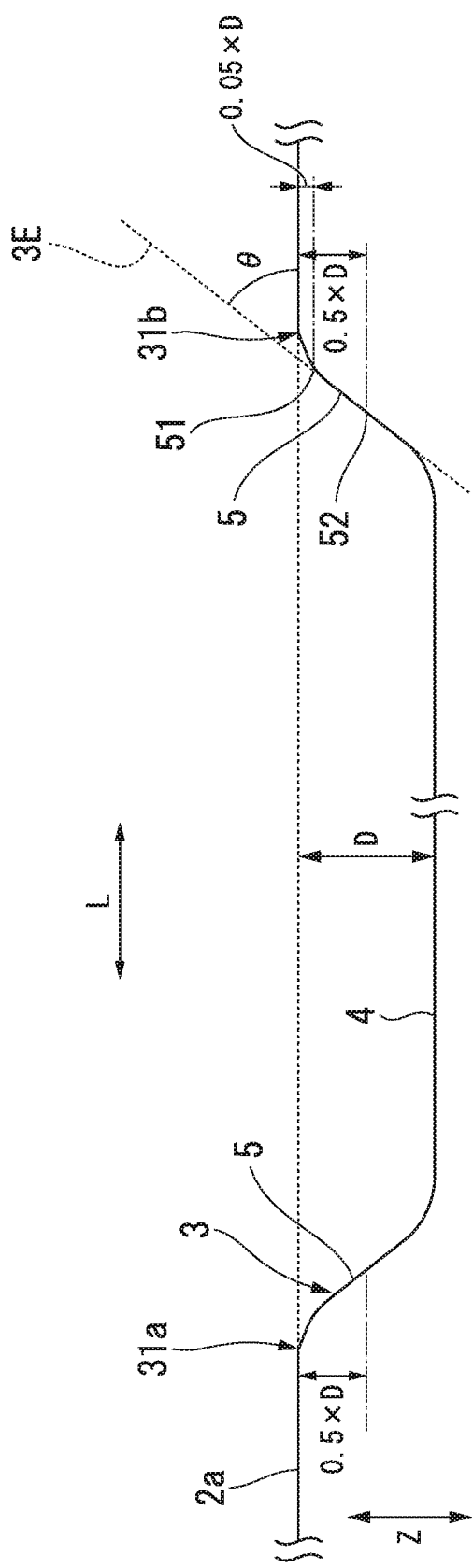
FIG. 2 is a view illustrating a cross-sectional shape of the groove along line A-A in FIG. 1.
Figure 3:
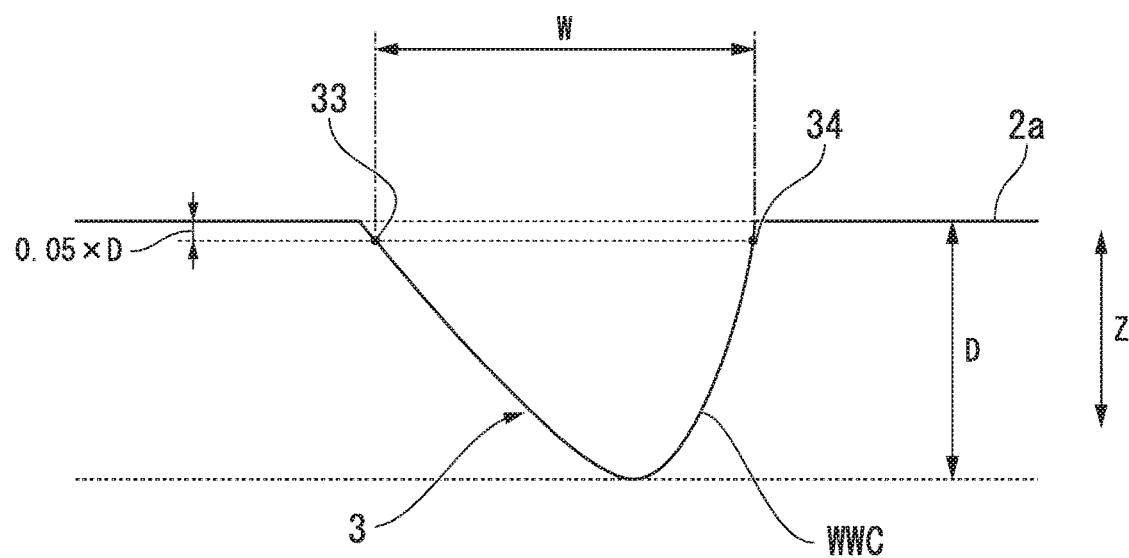
FIG. 3 is a view illustrating a cross-sectional shape of the groove along line B-B in FIG. 1.

FIG. 1 is a plan view of a grain-oriented electrical steel sheet 1 according to this embodiment. FIG. 2 is an arrow cross-sectional view taken along line A-A in FIG. 1. FIG. 3 is an arrow cross-sectional view taken along line B-B in FIG. 1. Furthermore, in FIG. 1 to FIG. 3, a rolling direction of the grain-oriented electrical steel sheet 1 is defined as X, a sheet width direction (direction perpendicular to the rolling direction in the same plane) of the grain-oriented electrical steel sheet 1 is defined as Y, and a sheet thickness direction (direction perpendicular to an XY plane) of the grain-oriented electrical steel sheet 1 is defined as Z.

FIG. 1 is a schematic view illustrating a groove 3 when the grain-oriented electrical steel sheet 1 according to this embodiment is seen from the sheet thickness direction Z (hereinafter, may be described as "in a plan view"). Actually, in steel sheet surface 2a and the groove 3 of an actual grain-oriented electrical steel sheet, a surface thereof is not uniformly formed, but in FIG. 1 to FIG. 3, FIG. 5 to FIG. 8, and FIG. 19, the steel sheet surface 2a and the groove 3 are schematically illustrated for explanation of characteristics of the invention. In addition, the groove 3 may have an arc shape when being seen from the sheet thickness direction Z (in a case of a plan view of the groove 3). In this embodiment, the groove 3 having a linear shape is exemplified for convenience of explanation.

The grain-oriented electrical steel sheet 1 includes a steel sheet (base metal) 2 in which a crystal orientation is controlled by a combination of a cold-rolling treatment and an annealing treatment so that a magnetization easy axis of a crystal grain and the rolling direction X match each other, and the groove 3 is provided in a surface (steel sheet surface 2a) of the steel sheet 2.

The steel sheet 2 contains, as chemical components in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities.

The chemical components of the steel sheet 2 are chemical components which are preferable after integration to a {110}<001> orientation, that is, after a control to a Goss texture. Among the elements, Si and C are basic elements, and acid-soluble Al, N, Mn, Cr, Cu, P, Sn, Sb, Ni, S, and Se are selective elements. The selective elements may be contained in correspondence with the purpose thereof. Accordingly, it is not necessary to limit the lower limit, and the lower limit may be 0%. In addition, the effect of this embodiment does not deteriorate even when the selective elements are contained as impurities. In the steel sheet 2, the remainder of the basic elements and the selective elements may be composed of Fe and impurities. In addition, the impurities represent elements which are unavoidably mixed in due to ore and scrap as a raw material, or a manufacturing environment and the like when industrially manufacturing the steel sheet 2.

In addition, an electrical steel sheet is typically subjected to purification annealing during secondary recrystallization. Discharge of an inhibitor forming element to the outside of a system occurs in the purification annealing. Particularly, a decrease in a concentration significantly occurs with respect to N and S, and the concentration becomes 50 ppm or less. Under typical purification annealing conditions, the concentration becomes 9 ppm or less, or 6 ppm or less. If the purification annealing is sufficiently performed, the concentration reaches to a certain extent (1 ppm or less) at which detection is impossible in typical analysis.

The chemical component of the steel sheet 2 may be measured in accordance with a typical steel analysis method. For example, the chemical components of the steel sheet 2 may be measured by using inductively coupled plasma-atomic emission spectrometry (ICP-AES). Specifically, it is possible to specify the chemical components by performing measurement for a test piece of 35 mm square, which is obtained from the central position of the steel sheet 2 after film removal, by using an ICP emission analyzing apparatus (for example, ICPS-8100, manufactured by Shimadzu Corporation) under conditions based on a calibration curve that is created in advance. Furthermore, C and S may be measured by using a combustion-infrared ray absorption method, and N may be measured by using inert gas fusion-thermal conductivity method.

The grain-oriented electrical steel sheet 1 according to this embodiment includes the groove 3 for magnetic domain refinement in the steel sheet surface 2a, and may include an insulating film (not illustrated) on the groove 3 and the steel sheet surface 2a.

In addition, a glass film (not illustrated) may be provided between the steel sheet surface 2a and the insulating film. For example, the glass film is constituted by a composite oxide such as forsterite ($Mg_2SiO_4$), spinel ($MgAl_2O_4$), and cordierite ($Mg_2Al_4Si_5O_{16}$). Although details will be described later, the glass film is a film that is formed to prevent adhering to the steel sheet 2 in a final annealing process that is one of manufacturing processes of the grain-oriented electrical steel sheet 1. Accordingly, the glass film is not an essential element among constituent elements of the grain-oriented electrical steel sheet 1. For example, the insulating film contains colloidal silica and phosphate, and plays a role of applying electrical insulating properties, a tensile force, corrosion resistance, heat resistance, and the like to the steel sheet 2.

Furthermore, for example, the glass film and the insulating film of the grain-oriented electrical steel sheet 1 can be removed by the following method. The grain-oriented electrical steel sheet 1 including glass film or the insulating film is immersed in an aqueous sodium hydroxide solution containing 10 mass % of NaOH and 90 mass % of $H_2O$ at 80° C. for 15 minutes. Then, the grain-oriented electrical steel sheet 1 is immersed in an aqueous sulfuric acid solution containing 10 mass % of $H_2SO_4$ and 90 mass % of $H_2O$ at 80° C. for 3 minutes. Then, the grain-oriented electrical steel sheet 1 is immersed in an aqueous nitric acid solution containing 10 mass % of $HNO_3$ and 90 mass % of $H_2O$ at room temperature for a time period that is slightly shorter than 1 minute, and is washed. Finally, the grain-oriented electrical steel sheet 1 is dried by using a warm wind blower for a time period that is slightly shorter than 1 minute. Furthermore, in a case where the glass film or the insulating film is removed from the grain-oriented electrical steel sheet 1 according to the above-described method, it is confirmed that a shape or roughness of the groove 3 of the steel sheet 2 is approximately the same as a shape or roughness before forming the glass film or the insulating film.

As illustrated in FIG. 1 and FIG. 2, the groove 3 is formed in such a manner that the groove 3 extends in a direction L that intersects the rolling direction X and a depth direction matches the sheet thickness direction Z. As illustrated in FIG. 2, in the groove 3, an inclined portion 5, which is inclined so that a depth becomes deeper from the steel sheet surface 2a to the bottom 4 of the groove 3, is formed on both ends in the direction L. A detailed shape of the groove 3 will be described later.

Terminologies in the following description will be defined. As illustrated in FIG. 1, in a case where the groove 3 is seen from the sheet thickness direction Z (in a case of a plan view of the groove 3), an extension direction (an arrow L illustrated in FIG. 1) of the groove 3 is referred to as a longitudinal groove direction L. In addition, in a plan view of the groove 3, a direction (an arrow Q illustrated in FIG. 1), which is perpendicular to the longitudinal groove direction L of the groove 3, is referred to as a groove width direction Q.

(Average Groove Depth D)

The depth of the groove 3 represents a length from the height of the steel sheet surface 2a to a surface (bottom 4) of the groove 3 in the sheet thickness direction Z. The average groove depth D may be measured as follows. In a case where the groove 3 is seen from the sheet thickness direction Z (in a case of a plan view of the groove 3), an observation range is set to a part of the groove 3. It is preferable that the observation range is set to a region excluding an end in the longitudinal groove direction L of the groove 3 (that is, a region in which a shape of the groove bottom is stable). For example, the observation region may be an observation region of which a length in the longitudinal groove direction L becomes approximately 30 μm to 300 μm at an approximately central portion in the longitudinal groove direction L. Next, a height distribution (groove depth distribution) in the observation range is obtained by using a laser microscope and the maximum groove depth is obtained in the observation range. The same measurement is performed at least at three or greater regions, and preferably 10 regions while changing the observation range. In addition, an average value of the maximum groove depth at the respective observation regions is calculated, and the average value is defined as an average groove depth D. For example, the average groove depth D of the groove 3 in this embodiment is preferably 5 μm to 100 μm, and more preferably greater than 10 μm and equal to or less than 40 μm so as to preferably obtain an effect of the magnetic domain refinement.

Furthermore, it is necessary to measure a position (height) of the steel sheet surface 2a in the sheet thickness direction Z in advance so as to measure a distance between the steel sheet surface 2a and the surface of the groove 3. For example, the position (height) in the sheet thickness direction Z is measured with respect to a plurality of sites on the steel sheet surface 2a in each of the observation ranges by using a laser microscope, and an average value of the measurement results may be used as the height of the steel sheet surface 2a. In addition, in this embodiment, when measuring an average groove width W as described later, a transverse groove cross-section is used. Accordingly, the steel sheet surface 2a may be measured from the transverse groove cross-section. Furthermore, when observing a steel sheet sample with a laser microscope, it is preferable that two sheet surfaces (an observation surface and a rear surface thereof) of the steel sheet sample are approximately parallel to each other.

(Average Groove Width W)

The width of the groove 3 represents a length of a groove opening in the transverse groove direction Q in a case where the groove 3 is seen on a cross-section (a groove-width-direction cross-section or a transverse groove cross-section) that is perpendicular to the longitudinal groove direction L. The average groove width W may be measured as follows.

As is the case with the average groove depth D, an observation range is set to a part of the groove 3 in a case where the groove 3 is seen from the sheet thickness direction Z (in a case of a plan view of the groove 3). It is preferable that the observation range is set to a region excluding an end in the longitudinal groove direction L of the groove 3 (that is, a region in which a shape of the groove bottom is stable).

For example, the observation region may be an observation range of which a length in the longitudinal groove direction L becomes approximately 30 μm to 300 μm at an approximately central portion in the longitudinal groove direction L. Next, a transverse groove cross-section that is perpendicular to the longitudinal groove direction L is obtained at arbitrary one site in the observation range (for example, a position of the maximum groove depth in the observation region) by using a laser microscope. A length of the groove opening is obtained from a contour curve of the steel sheet surface 2a and the groove 3 on the transverse groove cross-section.

Specifically, after obtaining a cross-section curve by applying a low-pass filter (cut-off value: λs) to the steel sheet surface 2a and a measurement cross-section curve MCL that constitutes a contour of the steel sheet surface 2a and the groove 3 that is shown on the transverse groove cross-section, when a band filter (cut-off value: λf, λc) is applied to the cross-section curve to remove long wavelength components and short wavelength components from the cross-section curve, as illustrated in FIG. 3, a waving curve WWC, which constitutes a contour of the groove 3 in the transverse groove cross-section, is obtained. The waving curve is one kind of contour curve that is suitable to simplify the shape of the contour to a smooth line.

As illustrated in FIG. 3, a length (groove opening) $W_n$ of a line segment, which connects two points (a third point 33 and a fourth point 34) at which the depth from the steel sheet surface 2a to the surface of the groove 3 along the sheet thickness direction Z becomes 0.05×D with respect to the average groove depth D of the groove 3, is obtained on the waving curve WWC of the groove 3 at the transverse groove cross-section.

The same measurement is performed at least at three regions or greater regions and preferably 10 regions while changing the observation range. In addition, an average value of the groove opening at the respective observation regions is calculated, and the average value is defined as an average groove width W. For example, it is preferable that the average groove width W of the groove 3 in this embodiment is 10 μm to 250 μm so as to preferably obtain the effect of the magnetic domain refinement.

Furthermore, it is necessary to measure a position (height) of the steel sheet surface 2a in the sheet thickness direction Z in advance so as to measure a depth, which becomes 0.05×D, from the steel sheet surface 2a. For example, the position (height) in the sheet thickness direction Z is measured with respect to a plurality of sites on the steel sheet surface 2a on a waving curve in each transverse groove cross-section, and an average value of the measurement results may be used as the height of the steel sheet surface 2a.

(First Angle θ)

Figure 4:
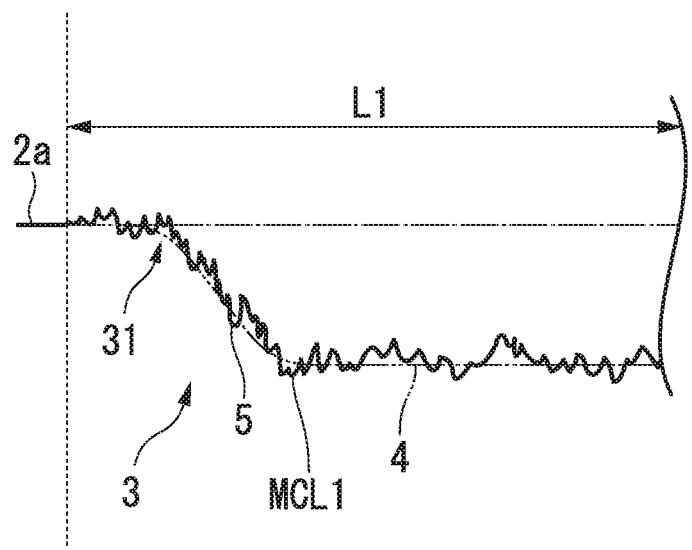
FIG. 4 is a view illustrating definition of a contour of the groove.

The first angle θ of the groove 3 represents an angle made by the steel sheet surface 2a and the end of the groove 3. The first angle θ may be measured as follows. In a case where the groove 3 is seen from the sheet thickness direction Z (in a case of a plan view of the groove 3), an observation range is set to a part of the groove 3 which includes an end in the longitudinal groove direction L. In a plan view of the groove 3 from the sheet thickness direction Z, a plurality of (n) virtual lines $L_1$ to $L_a$ are virtually set in the observation range along the longitudinal groove direction L (refer to FIG. 6). It is preferable that the observation range is set to a region including the end of the groove 3 (that is, a region including a starting point of the groove 3 in the longitudinal groove direction L to a region in which a shape of the groove bottom is stable). Next, when measuring a height distribution (groove depth distribution) of the groove 3 in the observation range along the virtual line $L_1$ by using a laser microscope (a laser type surface roughness measuring device), as illustrated in FIG. 4, a measurement cross-section curve MCL 1, which constitutes a contour of the end of the groove 3 in the longitudinal groove direction L, is obtained in a shape conforming to the virtual line L1.

Figure 5:
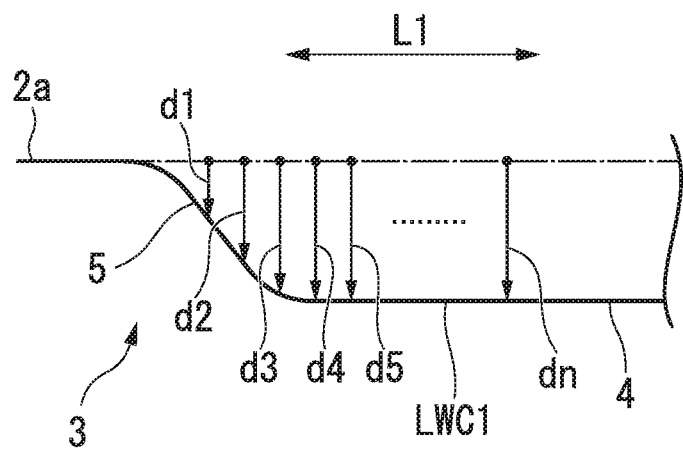
FIG. 5 is a view illustrating a cross-sectional shape of the groove in a longitudinal groove direction.
Figure 6:
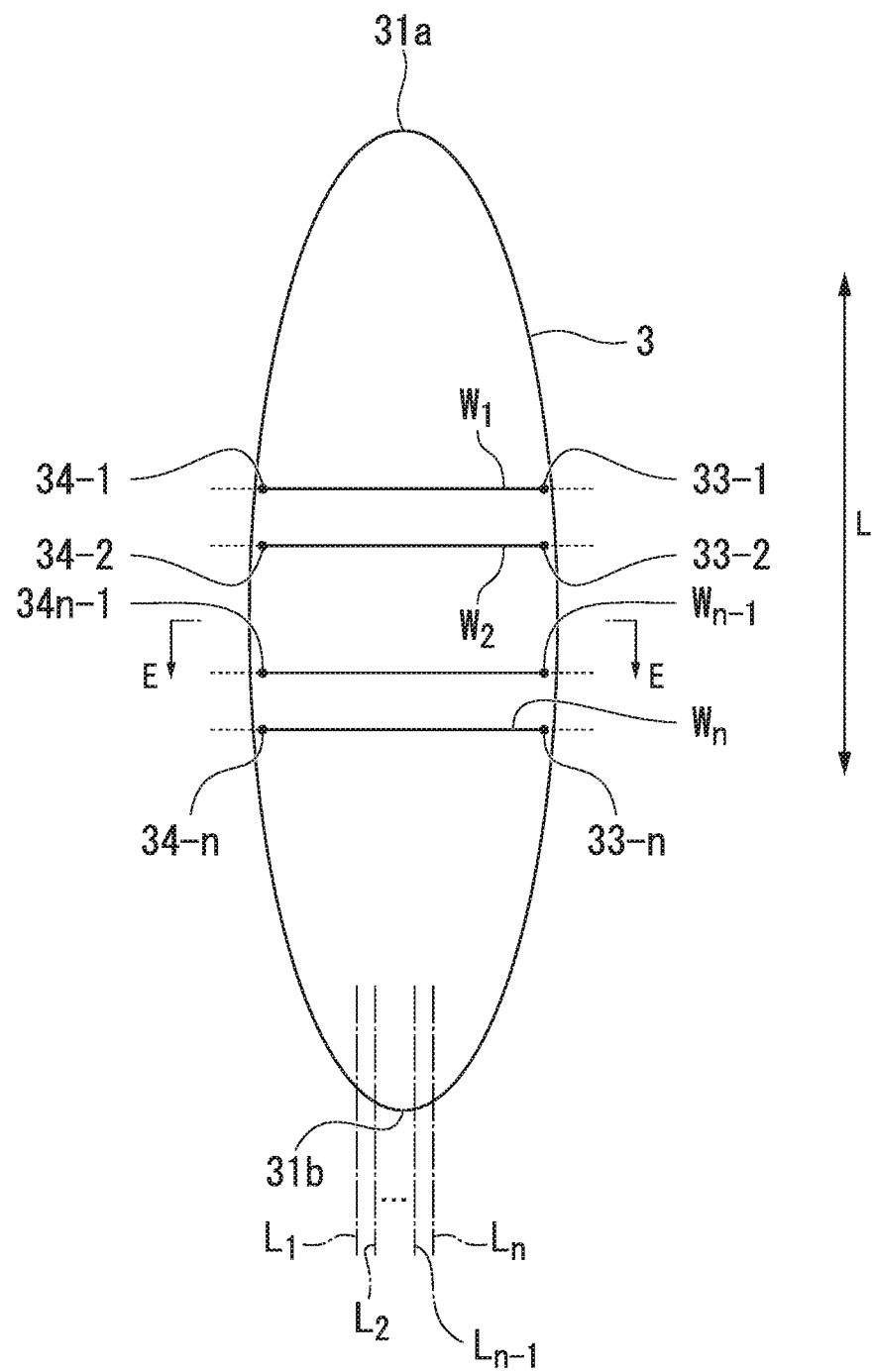
FIG. 6 is a view illustrating definition of a first angle.

After obtaining a cross-section curve by applying a low-pass filter (cut-off value: λs) to the measurement cross-section curve MCL1 obtained with respect to the virtual line L1, when a band filter (cut-off value: λf, λc) is applied to the cross-section curve to remove long wavelength components and short wavelength components from the cross-section curve, as illustrated in FIG. 5, a waving curve LWC1, which constitutes a contour of the end of the groove 3 in the longitudinal groove direction L, is obtained in a shape conforming to the virtual line L1.

As illustrated in FIG. 5, when using the waving curve LWC1, distances (depths d1 to dn: unit is μm) in the sheet thickness direction Z between the steel sheet surface 2a and the contour (that is, the waving curve LWC1) of the groove 3 are obtained at a plurality of (n) positions along the virtual line L. In addition, an average value (groove depth D1) of the depths d1 to dn is obtained. Groove depths D2 to Dn of the groove end are also obtained with respect to other virtual lines L2 to Ln according to the same measurement method.

Furthermore, it is necessary to measure a position (height) of the steel sheet surface 2a in the sheet thickness direction Z in advance so as to measure the depths d1 to dn from the steel sheet surface 2a. For example, the position (height) in the sheet thickness direction Z may be measured with respect to a plurality of sites on the steel sheet surface 2a in the measurement range by using the laser microscope, and an average value of the measurement results may be used as the height of the steel sheet surface 2a.

In this embodiment, among the virtual line L1 to Ln, a virtual line, which conforms to the longitudinal groove direction L and satisfies a condition in which the average depth of the groove 3 becomes the maximum, is selected as a groove reference line BL. For example, among the groove depths D1 to Dn obtained with respect to the virtual lines L1 to Ln illustrated in FIG. 6, the groove depth D2 is the maximum, the virtual line L2 is defined as the groove reference line BL.

Figure 7:
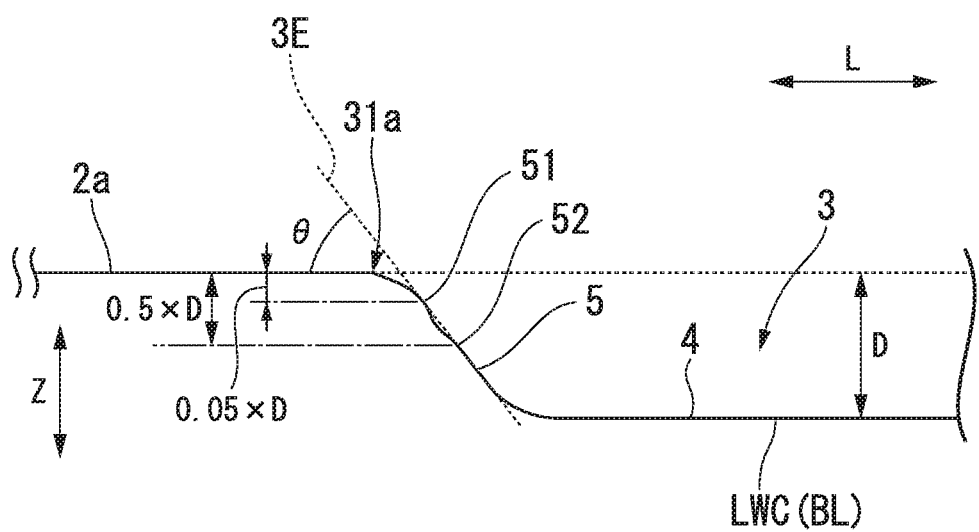
FIG. 7 is a view illustrating definition of the first angle.

As illustrated in FIG. 7, on a waving curve shape based on the groove reference line BL, a straight line, which connects a first point 51 at which the depth from the steel sheet surface 2a in the sheet thickness direction Z becomes 0.05×D, and a second point 52 at which the depth from the steel sheet surface 2a in the sheet thickness direction Z becomes 0.50×D, is set as a groove end straight line 3E. In addition, the first angle θ of the groove 3 is defined as an inclination angle of the groove end straight line 3E with respect to the steel sheet surface 2a.

Furthermore, it is necessary to subject the steel sheet surface 2a to linear approximation so as to measure the first angle θ.

For example, on a waving curve shape based on the groove reference line BL, only a region of the steel sheet surface 2a except for the groove 3 may be subjected to the linear approximation. An inclination angle between the steel sheet surface 2a subjected to the linear approximation and the groove end straight line 3E may be measured. An inclination angle (first angle θ) made by the groove end straight line 3E and the steel sheet surface 2a is obtained at both ends of the groove 3 in the longitudinal groove direction L by the same method.

The present inventors have repeated a thorough experiment to search a groove shape in which an improvement of the magnetic characteristics and rust resistance are compatible with each other. As a result, they found the following shape as the groove shape. Specifically, as illustrated in FIG. 2, an end of the groove 3, which is provided in the grain-oriented electrical steel sheet 1 according to this embodiment, may be inclined so that in groove ends 311a and 311b of the groove 3 in the longitudinal groove direction L, a relationship between an angle (first angle θ) made by the groove end straight line 3E and the steel sheet surface 2a, and an aspect ratio A obtained by dividing the average groove depth D by the average groove width W satisfy the following Expression (1).

$$\theta < -21 \times A + 77 \quad (1)$$

The first angle θ, which represents an inclination angle of the inclined portion 5, is defined on the basis of an aspect ratio A (=D/W) that is obtained by dividing the average groove depth D by the average groove width W. Typically, as the average groove depth D is greater, the iron loss affected by the groove depth is improved. In addition, as the average groove width W is smaller, a deterioration amount of a magnetic flux density that deteriorates due to removal of a steel portion is suppressed to be small. Accordingly, the iron loss can be improved. That is, as the aspect ratio A is greater, it is possible to preferably control the magnetic characteristics. On the other hand, as the aspect ratio A is greater, a coating solution is less likely to intrude into the groove. Therefore, the rust resistance deteriorates. Particularly, the rust resistance deteriorates at the groove end of the groove 3. Accordingly, it is necessary to control the aspect ratio A and the first angle θ in combination with each other so as to make the magnetic characteristics and the rust resistance be compatible with each other. Specifically, when the first angle θ of the groove 3 deviates from the range of Expression (1), the inclination angle of the groove end of the groove 3 with respect to the aspect ratio becomes great. Therefore, it is difficult to coat the groove 3 with the glass film or the insulating film at the groove end of the groove 3. As a result, rust is likely to occur at the groove end of the groove 3.

That is, as the average groove depth D is deeper, it is necessary make the inclination angle (first angle θ) at the groove end be smaller so as to suppress occurrence of rust. In addition, as the average groove width W is narrower, it is necessary to make the inclination angle (first angle θ) at the groove end be smaller so as to suppress occurrence of rust. In addition, when a relationship of the average groove depth D, the average groove width W, and the first angle θ satisfies Expression (1), it is possible to attain the effect of making a magnetic characteristic improvement and rust resistance be compatible with each other in the groove 3.

Furthermore, Expression (1) is a range suitable for a case where the average groove depth D of the groove 3 is 5 m or greater. When the average groove depth D of the groove 3 is less than 5 μm, a difference in a shape of the end of the groove 3 is small, and a problem relating to the rust resistance is less likely to occur. On the other hand, when the average groove depth D of the groove 3 is less than 5 µm, refinement of the magnetic domain due to formation of the groove may not be sufficient. The upper limit of the depth of the groove 3 is not particularly limited. However, when the average groove depth D of the groove 3 becomes 30% or greater with respect to the thickness of the grain-oriented electrical steel sheet in the sheet thickness direction Z, the amount of the grain-oriented electrical steel sheet that is a magnetic material, that is, the amount of the steel sheet decreases. Therefore, there is a concern that the magnetic flux density may decrease. For example, the upper limit of the average groove depth D of the groove 3 may be 100 µm when considering that a typical thickness of the grain-oriented electrical steel sheet for a wound transformer is 0.35 mm or less. The groove 3 may be formed in one surface of the grain-oriented electrical steel sheet, or may be formed in both surfaces thereof.

From a result of an experiment, it becomes apparent that it is preferable for the following Expression (2) to be satisfied in addition to Expression (1), because occurrence of rust can be suppressed with higher accuracy.

$$\theta < 32 \times A^2 - 55 \times A + 73 \quad (2)$$

In addition, from a result of an experiment, it becomes apparent that in a case where the average groove depth D is in a range of 15 µm to 30 µm, it is more preferable for the first angle θ of the groove end of the groove 3 to satisfy the following Expression (3) with respect to the average groove depth D and the average groove width W from the viewpoint of improving the rust resistance.

$$\theta \leq 0.12 \times W - 0.45 \times D + 57.39 \quad (3)$$

In addition, in a case where the average groove width W is greater than 30 µm and equal to or less than 100 µm, from a result of an experiment, it becomes apparent that it is more preferable for the first angle θ of the groove end of the groove 3 to satisfy the following Expression (4) with respect to the average groove depth D and the average groove width W from the viewpoint of improving the rust resistance.

$$\theta \leq -0.37 \times D + 0.12 \times W + 55.39 \quad (4)$$

In the grain-oriented electrical steel sheet 1 according to this embodiment, even in a case where the average groove depth D is 15 µm to 30 µm, when the groove 3 is formed in such a manner that the first angle θ satisfies Expression (3), covering with the glass film or the insulating film is possible without a deviation, and it is possible to make the magnetic characteristics and the rust resistance be compatible with each other.

Similarly, even in a case where the average groove width W is greater than 30 µm and equal to or less than 100 µm, when the first angle θ satisfies Expression (4), the magnetic characteristics and the rust resistance can be compatible with each other. In a case where a plurality of grooves are formed in the grain-oriented electrical steel sheet, when the above-described conditions are satisfied with respect to the entirety of the grooves, a grain-oriented electrical steel sheet with high quality is obtained. However, in a case where ends of the groove reach both end surfaces of the grain-oriented electrical steel sheet in the sheet width direction Y, the inclined portion is not formed at the ends of the groove. Accordingly, it is needless to say that the above-described conditions are not applied.

A glass film having an average thickness of 0 to 5 µm and an insulating film having an average thickness of 1 µm to 5 µm may be disposed in the groove 3. In addition, a glass film having an average thickness of 0.5 µm to 5 µm and an insulating film having an average thickness of 1 µm to 5 µm may be disposed on the steel sheet surface 2a. In addition, the average thickness of the glass film in the groove 3 may be smaller than the average thickness of the glass film on the steel sheet surface 2a.

Furthermore, when employing a configuration in which the glass film does not exist in the groove 3 (that is, a configuration in which the average thickness of the glass film in the groove 3 is zero), it is possible to further reduce a distance (groove width) between groove wall surfaces which face each other. Accordingly, it is possible to further improve the magnetic domain refinement effect (that is, the anomalous eddy current loss reducing effect) due to the groove 3.

In addition, as described above, in this embodiment, the glass film is not an essential constituent element. Accordingly, when the embodiment is applied to with respect to a grain-oriented electrical steel sheet that is constituted by only the steel sheet 2 and the insulating film, it is also possible to obtain an effect of improving the rust resistance. In the grain-oriented electrical steel sheet that is constituted by only the steel sheet 2 and the insulating film, an insulating film having an average thickness of 1 µm to 5 µm may be formed in the groove 3, and an insulating film having an average thickness of 1 µm to 5 µm may be formed on the steel sheet surface 2a.

In this embodiment, in the steel sheet 2, it is preferable that an average grain size of a crystal grain (secondary recrystallized grain) that is in contact with the groove 3 is 5 µm or greater. In addition, the upper limit of the grain size of the crystal grain that is in contact with the groove 3 is not particularly limited, but the upper limit may be set to $100 \times 10^3$ µm or less. In a case where a melted and resolidified region, which is derived from formation of the groove 3, exists at the periphery of the groove 3, the grain size of the crystal grain that is in contact with the groove 3 becomes fine.

In this case, there is a high possibility that the crystal orientation finally deviates from the {110}<001> orientation. Therefore, there is a high possibility that preferable magnetic characteristics are not obtained. Accordingly, it is preferable that the melted and resolidified region does not exist at the periphery of the groove 3. In a case where the melted and resolidified region does not exist at the periphery of the groove 3, the average grain size of the crystal grain (secondary recrystallized grain) that is in contact with the groove 3 becomes 5 µm or greater. In addition, the upper limit of the grain size of the crystal grain that is in contact with the groove 3 is not particularly limited, but the upper limit may be set to $100 \times 10^3$ µm or less.

Furthermore, the grain size of the crystal grain represents an equivalent circle diameter. For example, the grain size of the crystal grain may be obtained in accordance with a typical crystal grain size measurement method such as ASTM and E112, or may be obtained in accordance with an electron back scattering diffraction pattern (EBSD) method. In addition, the crystal grain that is in contact with the groove 3 may be observed on the transverse groove cross-section or a cross-section that is perpendicular to the sheet thickness direction Z. For example, the groove that does not include the melted and resolidified region may be obtained in accordance with a manufacturing method to be described later.

Particularly, in a case where the groove 3 is seen on the transverse groove cross-section, it is preferable that a grain size of a crystal grain (secondary recrystallized grain), which exists on a lower side of the groove 3 in the steel sheet 2, in the sheet thickness direction is equal to or greater than 5 μm and equal to or less than the sheet thickness of the steel sheet 2. This characteristic represents that a fine grain layer (melted and resolidified region), in which a grain size of a crystal grain in a sheet thickness direction is approximately 1 μm, does not exist on a lower side of the groove 3 in the steel sheet 2.

Figure 8:
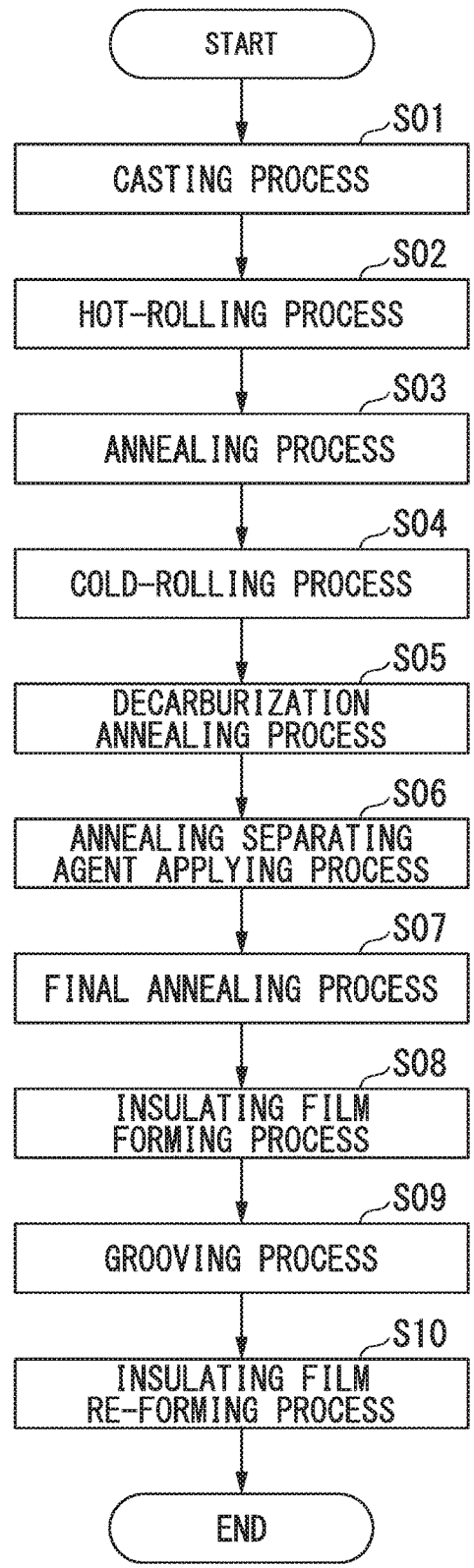
FIG. 8 is a flowchart illustrating manufacturing processes of the grain-oriented electrical steel sheet according to this embodiment.

Next, description will be given of a method of manufacturing the grain-oriented electrical steel sheet 1 according to this embodiment. FIG. 8 is a flowchart illustrating manufacturing processes of the grain-oriented electrical steel sheet 1. As illustrated in FIG. 8, in a first casting process S01, molten steel, which has a chemical composition including, in terms of mass fraction, Si: 0.8% to 7%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities, is supplied to a continuous casting machine, and a slab is continuously produced. Subsequently, in a hot-rolling process S02, the slab obtained in the casting process S01 is heated under a predetermined temperature condition (for example, 1150 to 1400° C.), and hot-rolling is performed with respect to the slab. According to this, for example, a hot-rolled steel sheet having the thickness of 1.8 to 3.5 mm is obtained.

Subsequently, in an annealing process S03, an annealing treatment is performed with respect to the hot-rolled steel sheet obtained in the hot-rolling process S02 under a predetermined temperature condition (for example, a condition in which heating is performed at 750 to 1200° C. for 30 seconds to 10 minutes).

Subsequently, in a cold-rolling process S04, pickling is performed as necessary with respect to a surface of the hot-rolled steel sheet that is subject to the annealing treatment in the annealing process S03, and then cold-rolling is performed with respect to the hot-rolled steel sheet. According to this, for example, a cold-rolled steel sheet having the thickness of 0.15 to 0.35 mm is obtained.

Subsequently, in a decarburization annealing process S05, a heat treatment (that is, a decarburization annealing treatment) is performed with respect to the cold-rolled steel sheet obtained in the cold-rolling process S04 under a predetermined temperature condition (for example, a condition in which heating is performed at 700 to 900° C. for 1 to 3 minutes) in a humid atmosphere. When the decarburization annealing treatment is performed, in the cold-rolled steel sheet, carbon is reduced to a predetermined amount or less, and primary recrystallized structure is formed. In addition, in the decarburization annealing process S05, an oxide layer, which contains silica ($SiO_2$) as a main component, is formed on a surface of the cold-rolled steel sheet.

Subsequently, in an annealing separating agent applying process S06, an annealing separating agent, which contains magnesia (MgO) as a main component, is applied to the surface (the surface of the oxide layer) of the cold-rolled steel sheet. Subsequently, in final annealing process S07, a heat treatment (that is, a final annealing treatment) is performed with respect to the cold-rolled steel sheet onto which the annealing separating agent is applied under a predetermined temperature condition (for example, a condition in which heating is performed at 1100 to 1300° C. for 20 to 24 hours). When the final annealing treatment is performed, secondary recrystallization occurs in the cold-rolled steel sheet, and the cold-rolled steel sheet is purified. As a result, it is possible to obtain a cold-rolled steel sheet which has the above-described chemical composition of the steel sheet 2 and in which a crystal orientation is controlled so that a magnetization easy axis of a crystal grain and the rolling direction X match each other (that is, the steel sheet 2 in a state before the groove 3 is formed in the grain-oriented electrical steel sheet 1).

In addition, when the final annealing treatment is performed as described above, an oxide layer containing silica as a main component reacts with the annealing separating agent that contain magnesia as a main component, and the glass film (not illustrated) including a composite oxide such as forsterite ($Mg_2SiO_4$) is formed on a surface of the steel sheet 2. In the final annealing process S07, the final annealing treatment is performed in a state in which the steel sheet 2 is coiled in a coil shape. The glass film is formed on the surface of the steel sheet 2 during the final annealing treatment. Accordingly, it is possible to prevent adhering to the steel sheet 2 that is coiled in a coil shape.

In an insulating film forming process S08, for example, an insulating coating solution containing colloidal silica and a phosphate is applied to the steel sheet surface 2a from an upper side of the glass film. Then, when a heat treatment is performed under a predetermined temperature condition (for example, 840 to 920° C.), the insulating film is formed on the surface of the glass film.

Subsequently, in a grooving process S09, the groove 3 is formed in the steel sheet surface 2a on which the glass film and the insulating film are formed. In the grain-oriented electrical steel sheet 1 according to this embodiment, the groove can be formed by a method such as a laser method, a press machine method, and an etching method. Hereinafter, description will be given of a method of forming the groove 3 in a case of using the laser method, the press machine method, the etching method, and the like in the grooving process S09.

(Groove Forming Method According to Laser Method)

Description will be given of a groove forming method according to the laser method.

In the grooving process S09, the surface (only one surface) of the steel sheet, on which the glass film is formed, is irradiated with a laser to form a plurality of the grooves 3, which extend in a direction intersecting the rolling direction X, in the surface of the steel sheet 2 along the rolling direction X at a predetermined interval.

Figure 9:
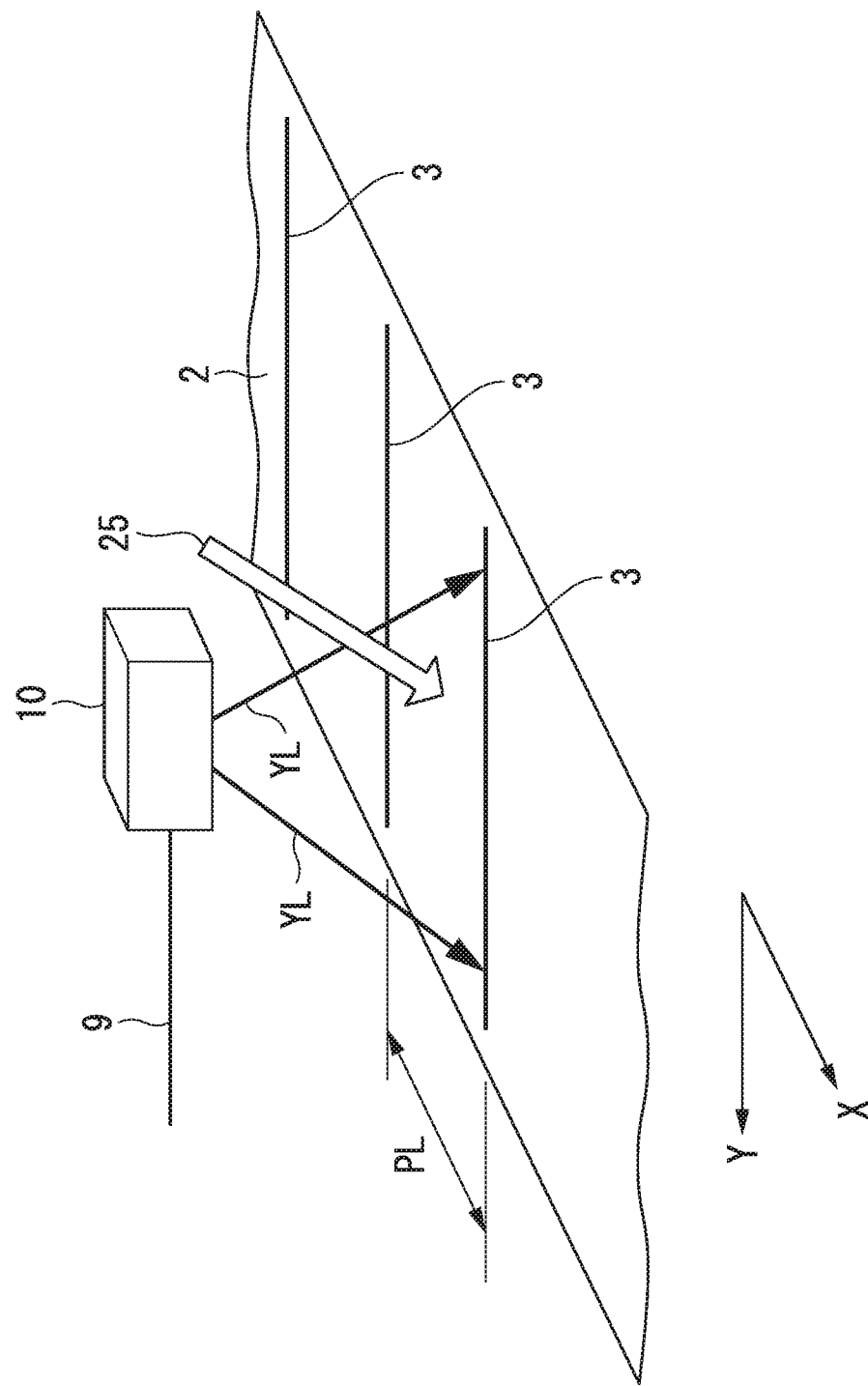
FIG. 9 is a view illustrating laser irradiation in a grooving process in the manufacturing processes of the grain-oriented electrical steel sheet according to this embodiment.

As illustrated in FIG. 9, in the grooving process S09, a laser light YL emitted from a laser light source (not illustrated) is transmitted to a laser irradiation device 10 through an optical fiber 9. A polygon mirror (not illustrated) and a rotary driving device (not illustrated) of the polygon mirror are embedded in the laser irradiation device 10. The laser irradiation device 10 irradiates the surface of the steel sheet 2 with the laser light YL and scans the steel sheet 2 with the laser light YL in a direction that is approximately parallel to the sheet width direction Y of the steel sheet 2 due to rotation of the polygon mirror.

An assist gas 25 such as air and an inert gas is sprayed to a portion of the steel sheet 2 which is irradiated with the laser light YL in combination with the irradiation with the laser light YL. Examples of the inert gas include nitrogen, argon, and the like. The assist gas 25 plays a role of removing a component that is melted or evaporated from the steel sheet 2 with the laser irradiation. The laser light YL stably reaches the steel sheet 2 due to the spraying of the assist gas 25. Accordingly, the groove 3 is stably formed. In addition, it is possible to suppress the component from being attached to the steel sheet 2 due to the spraying of the assist gas 25. As a result, the groove 3 is formed along a scanning line of the laser light YL.

The surface of the steel sheet 2 is irradiated with the laser light YL while the steel sheet 2 is conveyed along a sheet travelling direction that matches the rolling direction X. Here, a rotational speed of the polygon mirror is controlled in synchronization with a conveying speed of the steel sheet 2 so that the groove 3 is formed at a predetermined interval PL along the rolling direction X. As a result, as illustrated in FIG. 9, a plurality of the grooves 3, which intersect the rolling direction X, are formed in the surface of the steel sheet 2 at the predetermined interval PL along the rolling direction X.

As the laser light source, for example, a fiber laser can be used. A high output laser such as a YAG laser, a semiconductor laser, and a $CO_2$ laser, which are typically used for industry, may be used as the laser light source. In addition, a pulse laser or a continuous wave laser may be used as the laser light source as long as the groove 3 can be stably formed. As irradiation conditions with the laser light YL, for example, it is preferable that a laser output is set to 200 W to 2000 W, a light-condensing spot diameter of the laser light YL in the rolling direction X (that is, a diameter including 86% of the laser output, hereinafter, referred to as 86% diameter) is set to 10 μm to 1000 μm, a light-condensing spot diameter (86% diameter) in the sheet width direction Y of the laser light YL is set to 10 μm to 4000 μm, a laser scanning speed is set to 1 m/s to 100 m/s, and a laser scanning pitch (interval PL) is set to 4 mm to 10 mm.

Figure 10:
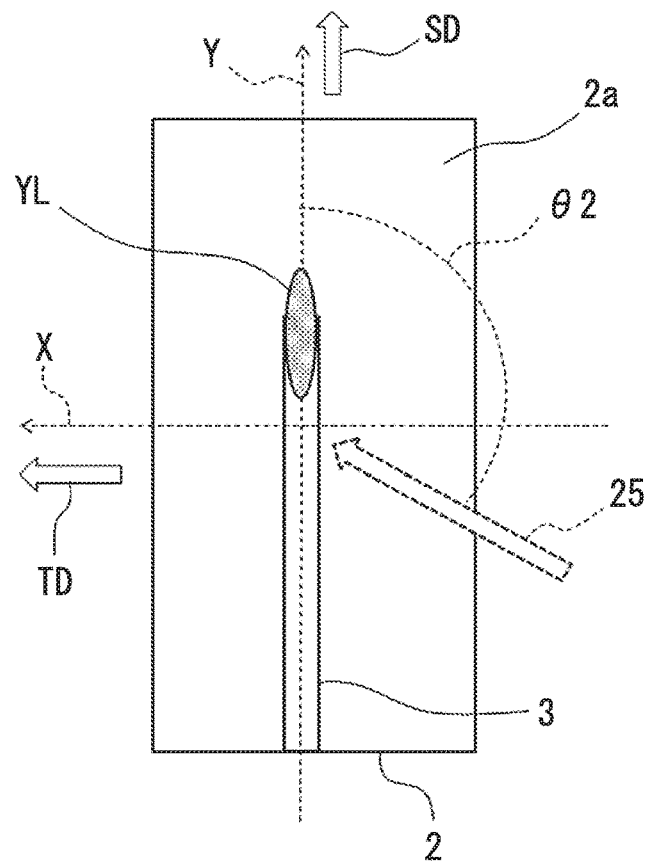
FIG. 10 is a view illustrating the laser irradiation in the grooving process in the manufacturing processes of the grain-oriented electrical steel sheet according to this embodiment.
Figure 11:
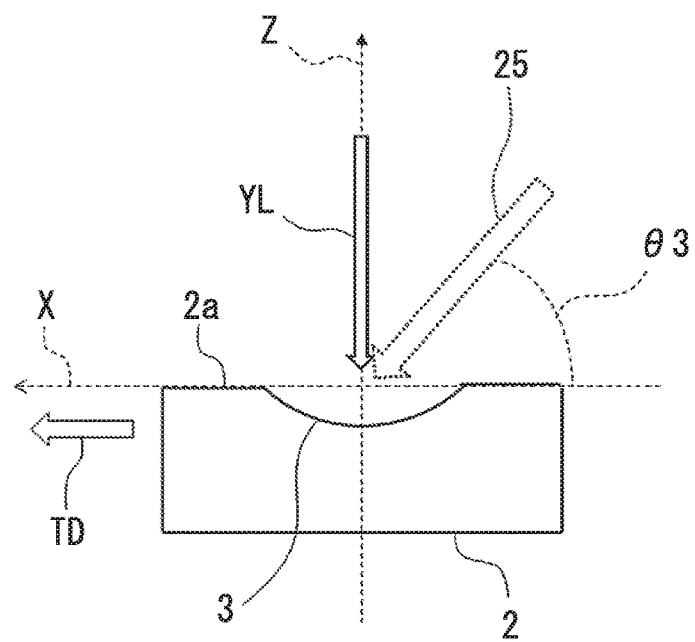
FIG. 11 is a view illustrating the laser irradiation in the grooving process in the manufacturing processes of the grain-oriented electrical steel sheet according to this embodiment.

As illustrated in FIG. 10, in the grooving process S09 of this embodiment, in a plan view of the steel sheet 2 that is conveyed along the sheet travelling direction TD parallel to the rolling direction X, the assist gas 25 is sprayed from a direction having an inclination of an angle θ2 with respect to the laser scanning direction SD (direction parallel to the sheet width direction Y) of the laser light YL so as to conform to the laser light YL. In addition, as illustrated in FIG. 11, when the steel sheet 2, which is conveyed along the sheet travelling direction TD, is seen from the sheet width direction Y (laser scanning direction SD), the assist gas 25 is sprayed from a direction having an inclination of an angle θ3 with respect to the steel sheet surface 2a so as to conform to the laser light YL. It is preferable that the angle θ2 is set in a range of 90° to 180°, and the angle θ3 is set in a range of ° to 85°. In addition, it is preferable that a flow rate of the assist gas 25 is set in a range of 10 liters/minute to 1000 liters/minute.

In addition, it is preferable to perform an atmosphere control so that the amount of particles, which exist in a sheet travelling atmosphere of the steel sheet 2 and have a diameter of 0.5 μm or greater, becomes equal to or greater than 10 pieces and less than 10000 pieces per 1 CF (cubic feet).

Figure 12:
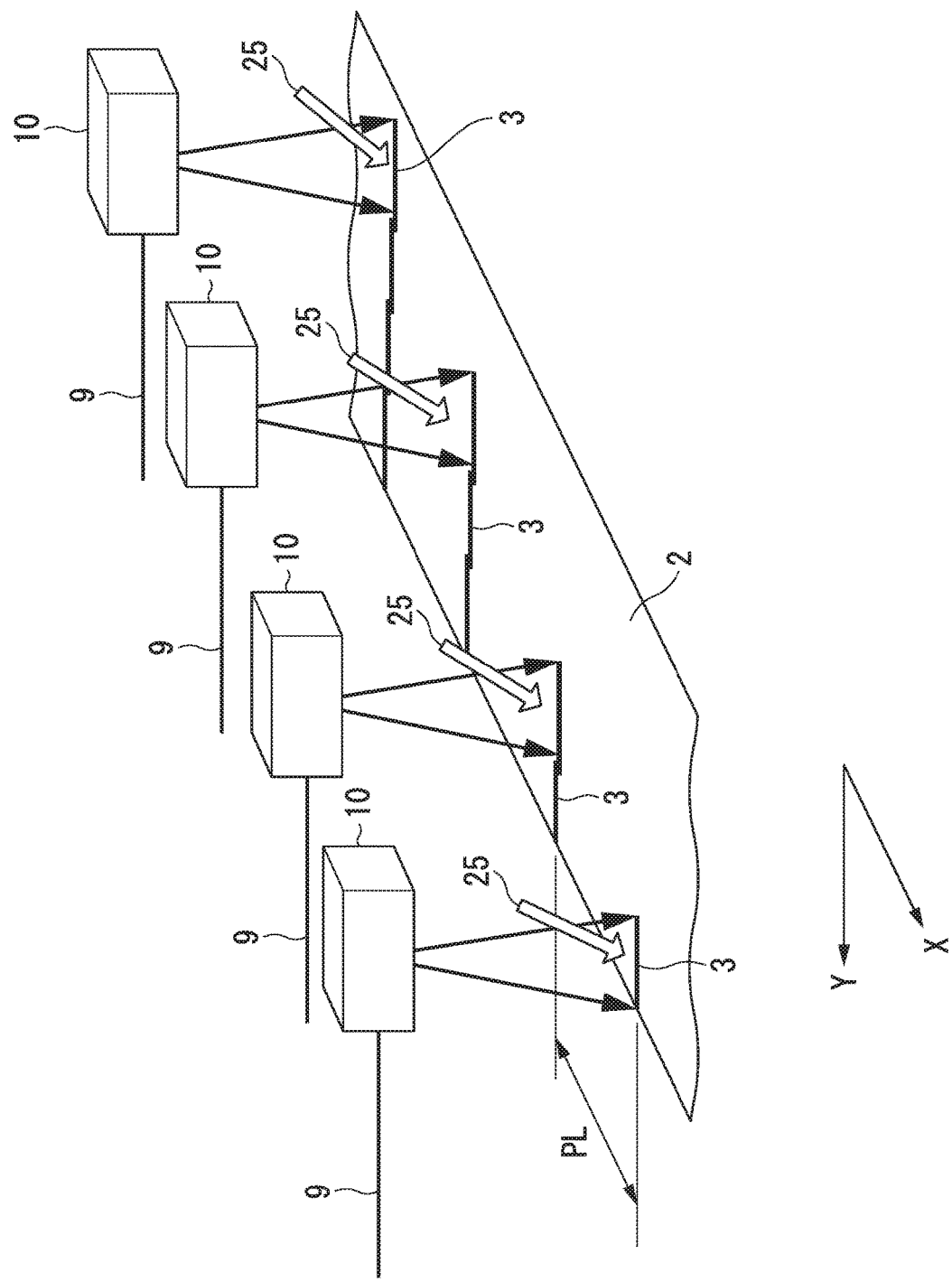
FIG. 12 is a view illustrating the laser irradiation in the grooving process in the manufacturing processes of the grain-oriented electrical steel sheet according to this embodiment.

Scanning with a laser beam over the whole width of the grain-oriented electrical steel sheet may be performed by one scanning apparatus as illustrated in FIG. 9, or may be performed by a plurality of the scanning apparatuses as illustrated in FIG. 12. In a case of using one light source, laser beams emitted from the light source and the resultant divided laser beams are used as the laser beam. In a case of using the plurality of laser irradiation devices 10, as illustrated in FIG. 12, the plurality of laser irradiation devices 10 are disposed along the rolling direction X at a predetermined interval. In addition, when seen from the rolling direction X, positions of the respective laser irradiation devices 10 in the sheet width direction Y are set so that laser scanning lines of the respective laser irradiation devices 10 do not overlap each other.

When using the laser irradiation method, a plurality of the grooves 3 can be formed in the steel sheet surface 2a. When using the plurality of scanning apparatuses, an irradiation region can be divided into a plurality of regions in the sheet width direction Y. Accordingly, scanning and irradiation time necessary for one laser beam, are shortened. Accordingly, the method of using the plurality of scanning apparatuses is suitable for high-speed sheet conveying facility. In a case where the plurality of scanning apparatuses are used, only one laser apparatus may be provided as a light source of the laser beam incident to the respective scanning apparatuses, or the laser apparatus may be provided to each of the scanning apparatuses.

A surface of the grain-oriented electrical steel sheet is scanned with the laser beam by one surface of the mirror, and the groove 3 having a predetermined length (for example, 300 mm) is formed in the grain-oriented electrical steel sheet in an approximately width direction. An interval of grooves adjacent to each other in the rolling direction X, that is, an irradiation pitch PL in the rolling direction (conveying direction) may be changed through adjustment of a velocity of a line VL and an irradiation speed. As described above, the grain-oriented electrical steel sheet is irradiated with the laser beam by using the laser irradiation device to form grooves in the rolling direction X at a constant scanning interval PL (an irradiation pitch, a groove interval). That is, the surface of the grain-oriented electrical steel sheet is irradiated with the laser beam, which is condensed thereto, while being scanned with the laser beam, thereby forming a groove that has a predetermined length and extends in a direction that is approximately perpendicular to the conveying direction of the grain-oriented electrical steel sheet (a direction that intersects the conveying direction, a direction including a vector perpendicular to the conveying direction) at a predetermined interval in the conveying direction. For example, the groove 3 is formed in a range of positive 45° to negative 45° with respect to a direction that is approximately perpendicular to the conveying direction of the grain-oriented electrical steel sheet.

Figure 13:
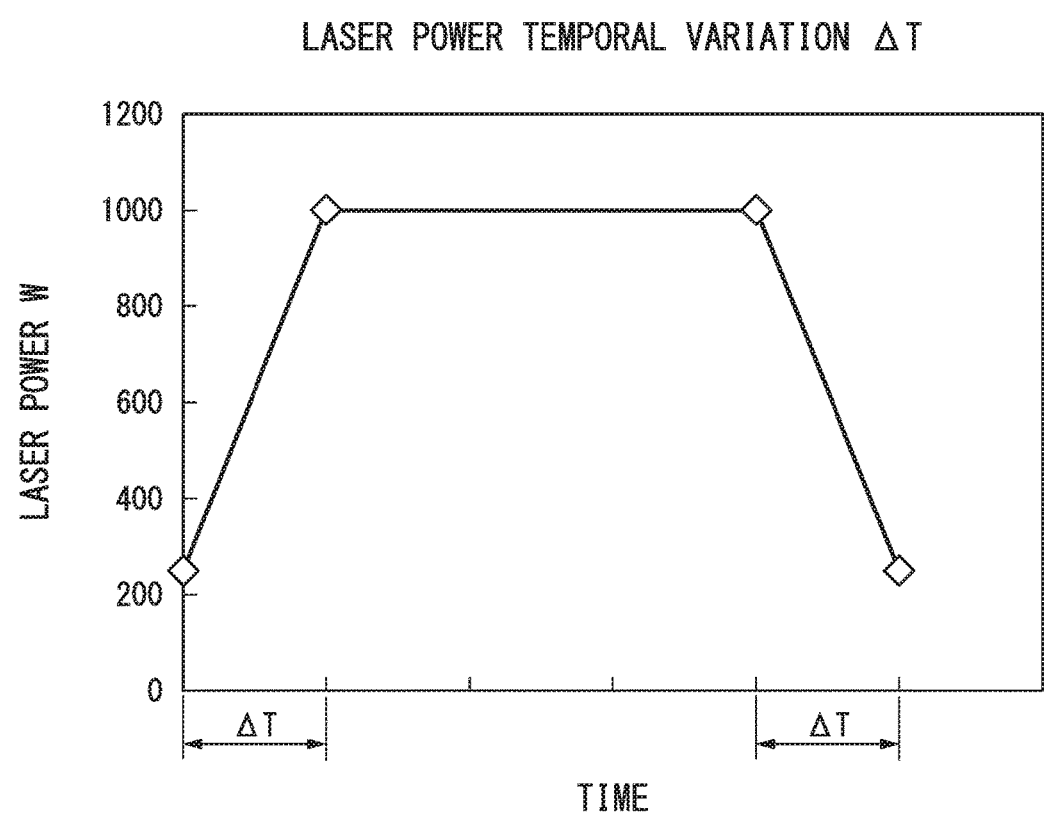
FIG. 13 is a graph illustrating a relationship between laser beam irradiation output and time in the grooving process by a laser method according to this embodiment.

At both scanning ends, an output of the laser is subjected to a temporal variation in synchronization with an operation of the mirror. According to this, the depth of the groove 3 is allowed to vary, and the ends 31a and 3b of the groove 3 are inclined. That is, as illustrated in FIG. 13, in the scanning direction, the output of the laser is set to vary at positions which become ends of the groove 3. For example, a groove width of the groove 3 is 100 μm, a groove depth is 20 μm, an irradiation pitch is 3 mm, and a scanning speed on the steel sheet is 30 m/s, time ΔT, at which the output of the laser is allowed to vary at formation initiation and formation termination of one groove, is set to 0.0004 ms or longer so as to set the first angle θ at a groove end to 600 or less. According to this, the groove 3, which is inclined at the first angle θ at ends of the groove 3 in the longitudinal groove direction L, is formed.

For example, as illustrated in FIG. 9, in the irradiation with the laser beam, scanning with the laser beam, which is emitted from the laser apparatus that is a light source, is performed by the scanning apparatus in the sheet width direction Y that is approximately perpendicular to the rolling direction X of the grain-oriented electrical steel sheet at the predetermined interval PL. At this time, the assist gas such as air and an inert gas is sprayed to a portion of the grain-oriented electrical steel sheet which is irradiated with the laser beam. As a result, the groove 3 is formed at a portion on a surface of the grain-oriented electrical steel sheet which is irradiated with the laser beam. The rolling direction X matches the sheet travelling direction.

A temperature of the grain-oriented electrical steel sheet when performing the irradiation with the laser beam is not particularly limited. For example, the irradiation with the laser beam can be performed with respect to the grain-oriented electrical steel sheet that is set to approximately room temperature. It is not necessary for a laser beam scanning direction to match the sheet width direction Y. However, it is preferable that an angle made by the scanning direction and the sheet width direction Y is in a range of 0° to 90° and is 45° or less from the viewpoint of working efficiency and the like, and when considering that a magnetic domain is subdivided into a longitudinal strip shape in the rolling direction. It is more preferable that the angle made by the scanning direction and the sheet width direction Y is 20° or less, and still more preferably 10° or less.

(Groove Forming Method According to Press Machine Method)

Description will be given of a method of forming the groove 3 of the grain-oriented electrical steel sheet 1 according to this embodiment according to a press machine method. In a case of forming the groove 3 in the grain-oriented electrical steel sheet by the press machine method, the groove is formed by using a tooth press tool corresponding to the shape of the groove 3 according to a known press machine method. That is, the groove 3 is formed by using a tooth press tool in which an inclined portion having the same angle as the first angle $\theta$ is formed at ends of the tooth press tool in a length direction.

(Groove Forming Method According to Electrolytic Etching Method)

Description will be given of a method of forming the groove in the grain-oriented electrical steel sheet 1 according to this embodiment according to an electrolytic etching method.

An etching resist layer, of which a portion corresponding to the shape of the groove is opened, is formed on the surface of the grain-oriented electrical steel sheet 1 after the insulating film forming process S08 through printing and the like. With regard to the opening of the etching resist layer, an etching resist is formed to be inclined in such a manner that an opening width in a transverse direction gradually decreases at sites corresponding to groove ends in order for the opening width at both ends to be narrower in comparison to the central portion in the longitudinal groove direction L. For example, the opening of the etching resist is formed in such a manner that the opening width in the transverse groove direction Q is set to 100 µm or greater, and a length of the sites inclined in correspondence with the groove ends in the longitudinal groove direction L becomes 14 µm to obtain a shape in which the average groove depth D is 20 µm, the groove width in the transverse groove direction Q is 50 µm, and the first angle $\theta$ is 55° or less. As a result, an inclined portion 5 is formed at the groove ends in which the opening width of the etching resist is set to be narrow. Then, an etching treatment is performed by using an etchant (NaCl and the like) at a liquid temperature of 30° C. for 20 seconds. Subsequently, the etching resist is peeled off from the grain-oriented electrical steel sheet to form the groove 3 in the steel sheet surface 2a.

After forming the groove 3 in the grooving process S09, the same treatment as in the insulating film forming process is performed again (insulating film re-forming process S10). The thickness of the insulating film that is obtained is 2 to 3 µm. According to the above-described processes, the grain-oriented electrical steel sheet according to this embodiment is obtained.

The steel sheet 2 of the grain-oriented electrical steel sheet 1 manufactured as described above contains, as chemical components in terms of mass fraction, Si: 0.8% to 7.0%, C: greater than 0% and equal to or less than 0.085%, acid-soluble Al: 0% to 0.065%, N: 0% to 0.012%, Mn: 0% to 1%, Cr: 0% to 0.3%, Cu: 0% to 0.4%, P: 0% to 0.5%, Sn: 0% to 0.3%, Sb: 0% to 0.3%, Ni: 0% to 1%, S: 0% to 0.015%, Se: 0% to 0.015%, and the remainder including Fe and unavoidable impurities.

Furthermore, the embodiment exemplifies a case of employing a manufacturing process in which the groove 3 is formed in the steel sheet surface 2a after the insulating film is formed on the steel sheet surface 2a with laser irradiation. In this case, the groove 3 immediately after laser irradiation is exposed to the outside. Accordingly, it is necessary to form an insulating film again on the steel sheet 2 after forming the groove 3. However, in this embodiment, it is possible to employ a manufacturing process in which the groove 3 is formed in the steel sheet surface 2a by irradiating the steel sheet surface 2a with the laser light YL before formation of the insulating film on the steel sheet surface 2a, and then the insulating film is formed on the steel sheet 2. Alternatively, in this embodiment, the glass film or the insulating film may be formed after the groove 3 is formed in the steel sheet 2.

Accordingly, the grain-oriented electrical steel sheet according to this embodiment includes the grain-oriented electrical steel sheet 1 for which high-temperature annealing for secondary recrystallization is completed and coating with the glass film and the insulating film is completed. However, the grain-oriented electrical steel sheet also includes a grain-oriented electrical steel sheet for which coating with the glass film and the insulating film is not completed. That is, a final product may be obtained by performing formation of the glass film and the insulating film as a post process by using the grain-oriented electrical steel sheet according to this embodiment. Furthermore, as described above, in a case of executing the film removing method, it is confirmed that the shape or the roughness of the groove 3 after removing the glass film or the insulating film is approximately the same as those before forming the glass film or the insulating film.

Furthermore, the embodiment exemplifies a case where the grooving process (laser irradiation process) S09 is executed after the final annealing process S07, but the grooving process may be executed between the cold-rolling process S04 and the decarburization annealing process S05. That is, after forming the groove 3 in the steel sheet surface 2a of the cold-rolled steel sheet by performing laser irradiation and spraying of the assist gas with respect to the cold-rolled steel sheet obtained in the cold-rolling process S04, the decarburization annealing may be performed with respect to the cold-rolled steel sheet.

This embodiment exemplifies a configuration in which the longitudinal groove direction L that is the extension direction of the groove 3 is a direction that intersects the rolling direction X and the sheet width direction Y. However, the extension direction of the groove 3 of the grain-oriented electrical steel sheet 1 according to this embodiment is not limited thereto. For example, even when the longitudinal groove direction L of the groove 3 is approximately perpendicular to the rolling direction X, the improvement of the magnetic characteristic and the rust resistance are compatible with each other.

In this embodiment, the number of the groove 3 that is formed in the grain-oriented electrical steel sheet is not particularly limited. For example, a plurality of the grooves 3 may be formed in the sheet width direction Y and the rolling direction X. In addition, the groove 3 may be formed as one long groove of which both ends extend to the vicinity of both ends of the steel sheet 2 in the sheet width direction Y, or a plurality of the grooves 3 may be formed in the rolling direction at an equal interval.

This embodiment exemplifies an example in which the shape of the groove 3 (shape of a boundary portion between the groove 3 and the steel sheet surface 2a) in a plan view is an elongated ellipse. However, the shape of the groove in the grain-oriented electrical steel sheet is not limited thereto. For example, the groove may have an arbitrary shape as long as the inclined portion is provided to the ends in the longitudinal groove direction L and the relationship of Expression (1) is satisfied.

FIG. 3 illustrates an example in which the shape of the groove 3 when seen from the transverse groove direction Q is asymmetrical to the groove width center in the transverse groove direction Q. However, the shape of the groove is not limited thereto.

EXAMPLES

Hereinafter, an effect of an aspect of the invention will be described more specifically with reference to examples, but a condition in Examples is one conditional example that is employed to confirm operability and an effect of the invention, and the invention is not limited to the one conditional example. The invention may employ various conditions as long as the object of the invention is accomplished without departing from the gist of the invention.

A slab, which has a chemical composition containing, in terms of mass fraction, Si: 3.0%, acid-soluble Al: 0.05%, C: 0.08%, N: 0.01%, Mn: 0.12%, Cr: 0.05%, Cu: 0.04%, P: 0.01%, Sn: 0.02%, Sb: 0.01%, Ni: 0.005%, S: 0.007%, Se: 0.001%, and the remainder including Fe and unavoidable impurities, was prepared. The hot-rolling process S02 was executed with respect to the slab to prepare a hot-rolled material having a thickness of 2.3 mm.

Subsequently, a heat treatment was performed with respect to the hot-rolled material under conditions of a temperature of 1000° C. for one minute (annealing process S03). Pickling was performed after the heat treatment, and then cold-rolling was performed (cold-rolling process S04) to prepare a cold-rolled material having the thickness of 0.23 mm.

Decarburization annealing was performed with respect to the cold-rolled material under a condition of a temperature of 800° C. for two minutes (decarburization annealing process S05).

An annealing separating agent containing magnesia as a main component was applied to both surfaces of the cold-rolled material after the decarburization annealing (annealing separating agent applying process S06). The cold-rolled material to which the annealing separating agent was applied was put in a furnace in a state of being coiled in a coil shape, and the final annealing process S07 was performed at a temperature of 1200° C. for 20 hours to prepare steel sheet base metal on which the glass film was formed on a surface thereof.

Next, an insulating material containing aluminum phosphate as a main component was applied onto the glass film, and baking was performed at a temperature of 850° C. for one minute to form the insulating film (insulating film forming process S08).

Subsequently, a groove, in which the average groove depth D, the average groove width W in the longitudinal groove direction L, and the first angle θ were set as illustrated in Table 1, was formed in the steel sheet surface 2a by using the laser method under conditions in which the laser scanning pitch (interval PL) was set to 3 mm, the beam diameter was set to 0.1 mm in the rolling direction and 0.3 mm in the scanning direction, and the scanning speed was set to 30 mm/s (grooving process S09). After the grooving process S09, application of the insulating material including aluminum phosphate as a main component was performed again, and baking was performed at a temperature of 850° C. for one minute to form the insulating film (insulating film re-forming process S10), thereby obtaining the grain-oriented electrical steel sheet. In addition, as comparative examples, grain-oriented electrical steel sheets, in which a steel sheet was formed in the same manner as in the grain-oriented electrical steel sheet in the examples, was prepared. A groove, in which the average groove depth D, the average groove width W in the longitudinal groove direction L, and the first angle θ were set as illustrated in Table 1, was formed in the grain-oriented electrical steel sheet.

The steel sheet (steel sheet in which a groove was formed) in the grain-oriented electrical steel sheet, which was finally obtained, mainly contained 3.0% of Si.

Contours of the grooves of the examples and the comparative examples were specified on the basis of the contour specifying method. First, a two-dimensional height distribution on ten straight lines $L_1$ to $L_{10}$ in the longitudinal groove direction L was measured with respect to the grooves in the examples and the comparative examples by using a non-contact laser meter (VK-9700, manufactured by Keyence Corporation). Ten patterns of contours of the grooves on the longitudinal groove cross-section were obtained on the basis of the measurement results. The average groove depth D was calculated from each of the ten patterns of contours of the longitudinal groove cross-section, and a contour of the longitudinal groove cross-section, in which the average groove depth D was the deepest, was extracted as a representative pattern. The average groove depth D of the representative pattern is illustrated in a column of the groove depth D in Table 1.

With regard to a contour on a cross-section in the transverse groove direction Q, a two-dimensional height distribution of a groove at twenty straight lines in the transverse groove direction Q was measured by using the same non-contact laser meter. Twenty patterns of contours of the transverse groove cross-section of the groove were obtained on the basis of the measurement results. In the obtained twenty patterns of contours of the transverse groove cross-section, a depth from the steel sheet surface 2a to the surface (contour) of the groove was measured to calculate an average transverse groove depth Ds. In the contours of the transverse groove cross-section, two points having an average transverse groove depth of Ds×0.05, were extracted, and a distance between the two points was measured as the groove width W. An average value of the groove width W obtained from the twenty patterns was calculated as an average groove width. Average groove widths (unit: μm) obtained in the examples and the comparative examples are illustrated in Table 1.

TABLE 1

|  | Average groove depth D (μm) | Average groove width W (μm) | Aspect ratio A = D/W | First angle θ (degree) | −21 × A + 77 | 32 × A² − 55 × A + 73 | θ ≤ 0.12 × W − 0.45 × D + 57.39 in case of 15 ≤ D ≤ 30 | θ ≤ −0.37 × D + 0.12 × W + 55.39 in case of 30 ≤ D ≤ 100 | Rust occurrence | Rust resistance |
|---|---|---|---|---|---|---|---|---|---|---|
| Example 1 | 10 | 200 | 0.05 | 70.0 | 76.0 | 70.3 | — | — | None | Very good |
| Example 2 | 50 | 200 | 0.25 | 56.0 | 71.8 | 61.3 | — | — | None | Very good |
| Example 3 | 10 | 30 | 0.33 | 55.0 | 70.0 | 58.2 | — | ○ | None | Very good |
| Example 4 | 20 | 50 | 0.40 | 54.0 | 68.6 | 56.1 | ○ | ○ | None | Very good |
| Example 5 | 15 | 30 | 0.50 | 52.5 | 66.5 | 53.5 | ○ | ○ | None | Very good |
| Example 6 | 15 | 20 | 0.75 | 48.0 | 61.3 | 49.8 | ○ | — | None | Very good |
| Example 7 | 50 | 50 | 1.00 | 48.0 | 56.0 | 50.0 | — | X | None | Very good |
| Example 8 | 15 | 300 | 0.05 | 73 | 76.0 | 70.3 | — | — | Occurred | Good |
| Example 9 | 50 | 200 | 0.25 | 65 | 71.8 | 61.3 | — | — | Occurred | Good |
| Example 10 | 50 | 150 | 0.33 | 60.5 | 70.0 | 58.2 | — | — | Occurred | Good |
| Example 11 | 10 | 25 | 0.40 | 58 | 68.6 | 56.1 | — | — | Occurred | Good |
| Example 12 | 50 | 100 | 0.50 | 56 | 66.5 | 53.5 | — | X | Occurred | Good |
| Example 13 | 15 | 20 | 0.75 | 53 | 61.3 | 49.8 | X | — | Occurred | Good |
| Example 14 | 50 | 50 | 1.00 | 51 | 56.0 | 50.0 | — | X | Occurred | Good |
| Comparative Example 1 | 20 | 100 | 0.20 | 75 | 72.8 | 63.3 | X | X | Occurred | Poor |
| Comparative Example 2 | 20 | 50 | 0.40 | 70 | 68.6 | 56.1 | X | X | Occurred | Poor |
| Comparative Example 3 | 20 | 20 | 1.00 | 60 | 56.0 | 50.0 | X | X | Occurred | Poor |

Examples 1 and 2 are examples which satisfy only the relationships of Expression (1) and Expression (2) described in the embodiment. Examples 8 to 14 are examples which satisfy only the relationship of Expression (1) described in the embodiment. Example 3 is an example that satisfies the relationships of Expression (1), Expression (2), and Expression (4) described in the embodiment. Examples 4 and 5 are examples which satisfy the relationships of Expression (1), Expression (2), Expression (3), and Expression (4) described in the embodiment. Example 6 is an example that satisfies the relationship of Expression (1), Expression (2), and Expression (3) described in the embodiment. In addition, grain-oriented electrical steel sheets, which do not satisfy Expression (1), were prepared as Comparative Examples 1 to 3.

Evaluation for the rust resistance was performed as follows. A test piece, which includes one groove and has a length of 30 mm per one side, was collected from each of the grain-oriented electrical steel sheets of the examples and the comparative examples, and was left as was indoors under conditions of a temperature of 50° C. and a humidity of 95% or greater for 48 hours, and then a rust occurrence situation in the test piece was confirmed. Presence or absence of rust was confirmed with the naked eyes. In addition, with regard to the rust resistance, the test piece was left as was in an atmosphere of a temperature of 50° C. and a humidity of 91% for one week, and evaluation was made on the basis of a variation of weight of the test piece before being left and after being left. When rust occurs, the weight of the test piece increases. Accordingly, as the weight increase amount was smaller, the rust resistance was determined as good. Specifically, the rust resistance of the test piece in which the weight increase amount was 1.0 mg/m² or less was evaluated as "very good", the rust resistance of the test piece in which the weight increase amount was 5.0 mg/m² or less was evaluated as "good", and the rust resistance of the test piece in which the weight increase amount was greater than 10.0 mg/m² was evaluated as "poor".

As illustrated in Table 1, from a result of the verification of the rust resistance of the grain-oriented electrical steel sheets of Examples 1 to 14, when a groove satisfying at least Expression (1) is formed, it was confirmed that the rust resistance of the grain-oriented electrical steel sheets is improved. The rust resistance of Comparative Examples 1 to 3 was evaluated as "poor".

In Examples 1 to 14, the grain size of the crystal grain, which is in contact with the groove in the steel sheet, was 5 μm or greater.

INDUSTRIAL APPLICABILITY

According to the aspect of the invention, it is possible to improve the rust resistance of the grain-oriented electrical steel sheet in which the groove is formed in the surface of the steel sheet for magnetic domain refinement. Accordingly, the invention has sufficient industrial applicability.

BRIEF DESCRIPTION OF THE REFERENCE SYMBOLS

1: GRAIN-ORIENTED ELECTRICAL STEEL SHEET
2: STEEL SHEET
2a: STEEL SHEET SURFACE
3: GROOVE
L: LONGITUDINAL GROOVE DIRECTION
X: ROLLING DIRECTION
Y: SHEET WIDTH DIRECTION
Z: SHEET THICKNESS DIRECTION
D: AVERAGE GROOVE DEPTH
θ: FIRST ANGLE
W: AVERAGE GROOVE WIDTH
51: FIRST POINT
52: SECOND POINT
3E: GROOVE END STRAIGHT LINE

The invention claimed is:
1. A grain-oriented electrical steel sheet, comprising:
a steel sheet having a steel sheet surface in which a groove, which extends in a direction intersecting a rolling direction and of which a groove depth direction matches a sheet thickness direction, is formed,
wherein the groove includes an inclined portion that is inclined from the steel sheet surface to a bottom portion of the groove at a groove end in a longitudinal groove direction that is a direction in which the groove extends, when an average value of a depth of the groove in the sheet thickness direction from a height of the steel sheet surface at a central portion in the longitudinal groove direction is set as an average groove depth D in a unit of μm, a straight line, which connects a first point at which the depth of the groove in the sheet thickness direction from the height of the steel sheet surface becomes 0.05×D, and a second point at which the depth of the groove in the sheet thickness direction from the height of the steel sheet surface becomes 0.50×D, at the inclined portion is set as a groove end straight line, an angle made by the steel sheet surface and the groove end straight line is set as a first angle θ in a unit of °, and in a case where the groove is seen on a groove-width-direction cross-section perpendicular to the longitudinal groove direction at the central portion of the groove, an average value of a groove-width-direction length, which is a length of a line segment connecting two points at which a depth of the groove in the sheet thickness direction from the height of the steel sheet surface in a contour of the groove on the groove-width-direction cross-section becomes 0.05×D, is set as an average groove width W of the groove in a unit of μm, an aspect ratio A obtained by dividing the average groove depth D by the average groove width W, and the first angle θ satisfy the following Expression (1), $$\theta < -21 \times A + 77 \qquad (1).$$

2. The grain-oriented electrical steel sheet according to claim 1, wherein the aspect ratio A and the first angle θ satisfy the following Expression (2), $$\theta < 32 \times A^2 - 55 \times A + 73 \qquad (2).$$

3. The grain-oriented electrical steel sheet according to claim 1,
wherein when the average groove depth D is 15 μm to 30 μm, the first angle θ, the average groove depth D, and the average groove width W satisfy the following Expression (3), $$\theta \leq 0.12 \times W - 0.45 \times D + 57.39 \qquad (3).$$

4. The grain-oriented electrical steel sheet according to claim 1,
wherein when the average groove width W is 30 μm to 100 μm, the first angle θ, the average groove depth D, and the average groove width W satisfy the following Expression (4), $$\theta \leq -0.37 \times D + 0.12 \times W + 55.39 \qquad (4).$$

5. The grain-oriented electrical steel sheet according to claim 1,
wherein in the steel sheet, a grain size of a crystal grain that is in contact with the groove is 5 μm or greater.

6. The grain-oriented electrical steel sheet according to claim 1,
wherein the average groove depth D is 10 μm to 50 μm.

* * * * *